United States Patent
Fukamachi et al.

(10) Patent No.: US 8,411,192 B2
(45) Date of Patent: Apr. 2, 2013

(54) IMAGE CAPTURING MODULE, METHOD FOR MANUFACTURING THE IMAGE CAPTURING MODULE, AND ELECTRONIC INFORMATION DEVICE

(75) Inventors: Takayuki Fukamachi, Hiroshima (JP); Shohgo Hirooka, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 887 days.

(21) Appl. No.: 12/271,298

(22) Filed: Nov. 14, 2008

(65) Prior Publication Data

US 2009/0160998 A1 Jun. 25, 2009

(30) Foreign Application Priority Data

Nov. 15, 2007 (JP) ................................. 2007-297306
Nov. 20, 2007 (JP) ................................. 2007-300976
Apr. 17, 2008 (JP) ................................. 2008-108373

(51) Int. Cl.
*H04N 5/225* (2006.01)

(52) U.S. Cl. ...................................................... 348/335

(58) Field of Classification Search .................. 348/335, 348/340; 396/529; 359/795, 796

See application file for complete search history.

(56) References Cited

U.S. PATENT DOCUMENTS

| 7,042,659 | B2 * | 5/2006 | Huang et al. | 359/796 |
| 7,423,334 | B2 * | 9/2008 | Tu et al. | 257/680 |
| 2007/0253708 | A1 * | 11/2007 | Watanabe et al. | 396/529 |

FOREIGN PATENT DOCUMENTS

| JP | 2004-080704 | 3/2004 |
| JP | 2004-260356 | 9/2004 |
| JP | 2004-266340 | 9/2004 |
| JP | 2005-043394 | 2/2005 |
| JP | 2005-333170 | 12/2005 |
| JP | 2006-148710 | 6/2006 |
| JP | 2007-147729 | 6/2007 |
| JP | 2007-259064 A * | 10/2007 |
| WO | WO 2004/010687 A1 * | 1/2004 |

\* cited by examiner

*Primary Examiner* — William B. Perkey
(74) *Attorney, Agent, or Firm* — Edwards Wildman Palmer LLP; David G. Conlin; Steven M. Jensen

(57) ABSTRACT

An image capturing module according to the present invention includes a holder member, which accommodates therein a focusing lens for forming an image of a subject light on an image capturing chip attached on a substrate and is attached to the substrate to cover the image capturing chip, where the holder member is directly supported on a surface of the image capturing chip.

20 Claims, 13 Drawing Sheets

FIG.10
(a)
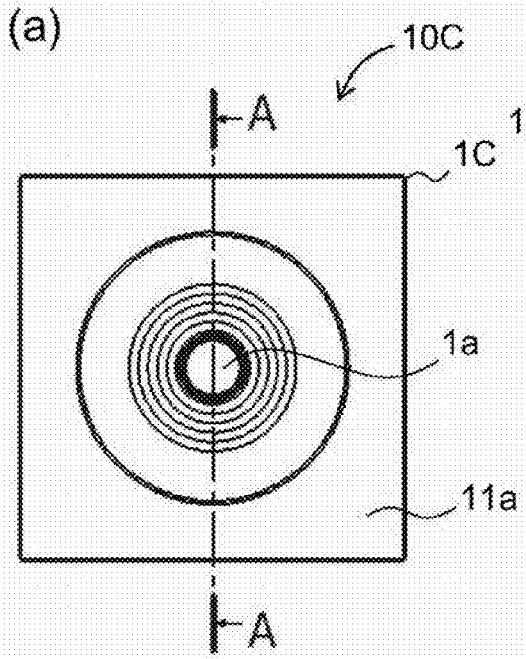
(b)
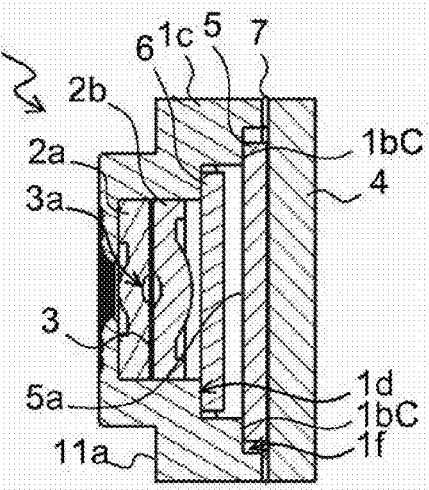
(c)
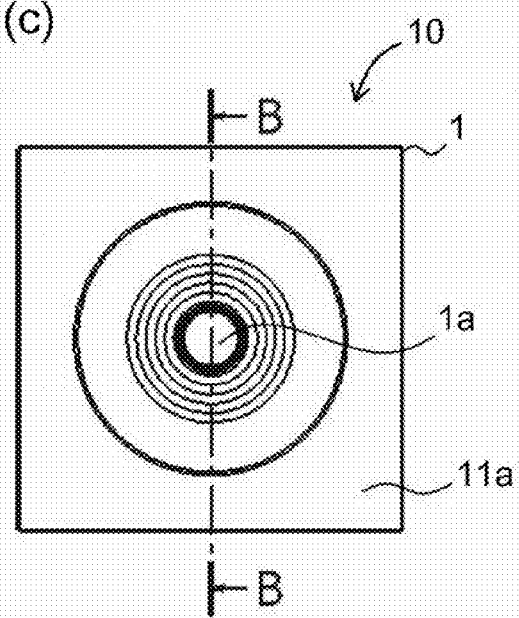
(d)
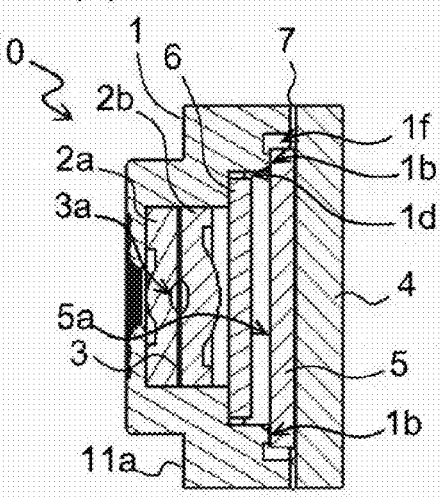

FIG.11
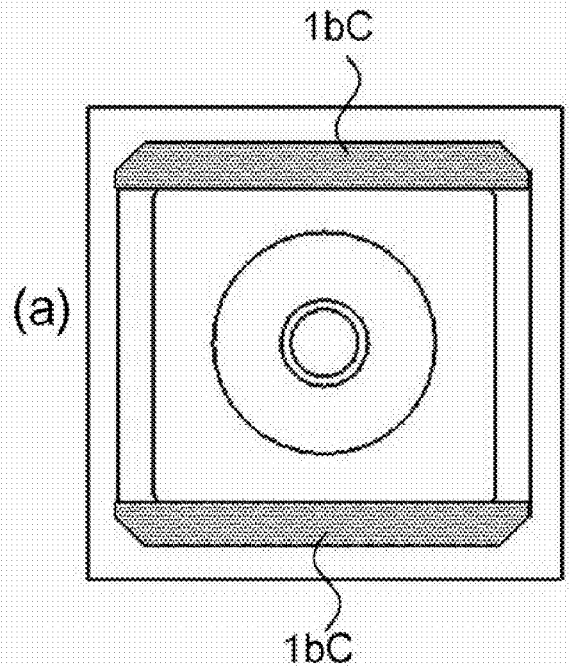
(a) — 1bC / 1bC
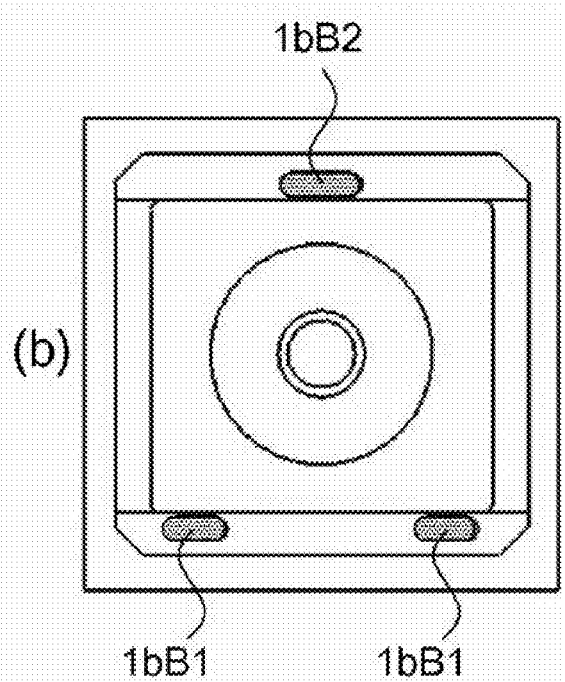
(b) — 1bB2 / 1bB1 / 1bB1

IMAGE CAPTURING MODULE, METHOD FOR MANUFACTURING THE IMAGE CAPTURING MODULE, AND ELECTRONIC INFORMATION DEVICE

This nonprovisional application claims priority under 35 U.S.C. §119(a) to Patent Application No. 2007-297306 filed in Japan on Nov. 15, 2007, Patent Application No. 2007-300976 filed in Japan on Nov. 20, 2007, and Patent Application No. 2008-108373 filed in Japan on Apr. 17, 2008, the entire contents of which are hereby incorporated by reference.

BACKGROUND OF THE INVENTION

1. Field of the Invention

The present invention relates to an image capturing module, in which an image capturing element having a plurality of light receiving sections for performing photoelectric conversions on and capturing image light from a subject and a lens for forming an image of incident light on the image capturing element are modularized (integrated); a method for manufacturing the image capturing module; and an electronic information device, such as a digital camera (e.g., digital video camera and digital still camera), an image input camera (e.g., car-mounted camera), a scanner, a facsimile machine, a camera-equipped cell phone device, and a personal digital assistant (PDA), having the image capturing module as an image input device (e.g., car-mounted camera) used in an image capturing section thereof.

2. Description of the Related Art

A conventional image capturing module of this type is mainly used for a camera-equipped cell phone device, a personal digital assistant (PDA), and further a card camera. In such an image capturing module, a solid-state image capturing chip, which includes a plurality of light receiving sections for performing photoelectric conversions on and capturing image light from a subject, and a holder member fixing a lens for forming an image of incident light on the image capturing element are provided on a substrate of ceramics, epoxy resin with glass in it, and the like. In this case, it is important to accurately fix a distance between the lens and the image capturing element and accurately form an image of incident light on the image capturing element in order to obtain a clear image.

Reference 1 discloses a way to directly contact and fix a bottom surface of a lens tube for fixing a lens on the periphery of an image capturing element on a solid-state image capturing chip, as a method for accurately defining the distance between the lens and the image capturing element. First, the image capturing module of Reference 1 will be described in detail with reference to FIG. 8.

FIG. 8 is a structural diagram schematically illustrating an exemplary essential structure of a conventional image capturing module disclosed in Reference 1. FIG. 8(a) is a longitudinal cross sectional view of the conventional image capturing module, and FIG. 8(b) is a top view of the conventional image capturing module.

In FIG. 8, a conventional image capturing module 100 includes a lens section 101 and an image sensor chip 102. Herein, the lens section 101 is configured of a lens 101a and a lens tube 101b for fixing the lens 101a. In addition, the image sensor chip 102 includes a sensor section 102a as an image capturing element, a logic circuit section 102b for processing a signal from the sensor section 102a, and a bonding pad 102c as an input and output terminal for connecting the logic circuit section 102b and the outside.

The lens 101a is an aspherical convex lens herein, and has a function for forming an image of incident light on a surface of the image sensor chip 102.

The lens tube 101b has a shape of a cylinder, a square shape and the like, and supports the lens 101a at a predetermined position in its internal circumference portion. The lens tube 101b functions as a lens supporting section. The lens supporting section is not required to be formed into a tube shape. For example, the lens supporting section may support the lens 101a with a single or multiple points from the bottom. The bottom surface of the lens tube 101b is fixed on the logic circuit section 102b of the image sensor chip 102 at a space d where no sensor cover 102d is provided. In this example, the sensor cover 102d is equipped with coupling sections e extending in four directions, and four lower end sections of the lens tube 101b are mounted and fixed on the image sensor chip 102 at the four spaces d without the coupling sections e.

The lens tube 101b and the image sensor chip 102 are adhered to each other by ultraviolet curable resin, for example. In this case, the bottom surface of the lower end portion of the lens tube 101b is placed on a predetermined position of the image sensor chip 102, and subsequently, ultraviolet curable resin is applied so as to adhere the image sensor chip 102 to the lens tube 101b. Alternately, the image sensor chip 102 and the lens tube 101b may be positioned after ultraviolet curable resin is applied to either or both of the image sensor chip 102 and the lens tube 101b. Ultraviolet rays are radiated on the ultraviolet curable resin so as to adhere and fix the image sensor chip 102 and the lens tube 101b. Thus, according to the conventional camera module 100, the lens supporting section (lens tube 101b) for supporting the lens 101a is placed on the image sensor chip 102 to be directly fixed, thereby achieving a reduction in size. Since the lens supporting section (lens tube 101b) is the only member between the lens 101a and the image sensor chip 102, the error due to stacking is small for the distance between the lens 101a and the sensor section 102a of the image sensor chip 102, and therefore, the relative positions of the lens and image sensor chip can be set with a high accuracy and be placed more securely.

The sensor section 102a of the image sensor chip 102 is formed on a center surface of the image sensor chip 102, and is an image capturing element for converting optical information into an electric signal and outputs the electric signal as an image capturing signal. The image capturing element includes a great number of readout pixels. The sensor section 102a is a CCD element and a CMOS element, for example. In the sensor section 102a, a plurality of microchip lenses are formed above the readout pixels, the microchip lenses being capable of focusing incident light on the readout pixels.

The logic circuit section 102b performs a variety of signal processing, such as amplifying process and a noise reduction process, for an image capturing signal outputted from each sensor section 102a.

The bonding pad 102c is an input and output terminal electrically connected to the logic circuit section 102b. The bonding pad 102c is electrically connected to an outer electrode by wire bonding. For example, the image sensor chip 102 is positioned on a circuit board that configures a circuit of a cell phone device, a personal digital assistant (PDA), a card camera and the like, and the bonding pad 102c and the circuit board are electrically connected by wire bonding. Further, the image sensor chip 102 is positioned on a sub circuit board, on which a passive part, such as a resistor and a capacitor, and an active part, such as a transistor and an LSI, are mounted; and the bonding pad 102c and the sub circuit board are electrically connected by wire bonding. The sub circuit board can also be electrically connected to a cell phone device, a personal digital assistant (PDA), a card camera and the like.

The sensor cover 102d is positioned for protecting at least the sensor section 102a, preventing a foreign object from adhering to the sensor section 102a. The sensor cover 102d has a contact section, which is fixed to the image sensor chip 102 outside the area of the sensor section 102a. A space is formed between the sensor cover 102d and the sensor section 102a. The sensor cover 102d is formed of a synthetic resin or glass, which is transparent. The synthetic resin includes various types of resin, such as silicon resin, polycarbonate resin, styrene resin, acrylic resin, nylon resin and the like. The sensor cover 102d is adhered or crimped onto the image sensor chip 102. When adhered, ultraviolet curable resin, for example, is used. The sensor cover 102d is formed at a manufacturing stage of an image capturing module, and is continued to be attached during the usage stage of the image capturing module. That is, the sensor cover 102d is not removed at the usage stage. Therefore, the sensor cover 102d above the sensor section 102a is required to be transparent in order to allow incident light to pass. However, the entire sensor cover 102d is not required to be transparent.

The distance between an incident surface of the sensor cover 102d, namely the surface on the lens 101a side, and the surface of the sensor section 102a is required to be greater than or equal to a predetermined distance. Incident light that has passed the lens 101a gradually converges and an image is formed on the sensor section 102a. Therefore, a foreign object would appear in a different size in an image captured by the sensor section 102a in a case where the foreign object adhered directly to the sensor section 102a and in a case where the foreign object adhered to the sensor cover 102d, which is away from the sensor section 102a upwards by a predetermined distance. Specifically, in a case where the lens 101a is a converging lens, the farther the incident surface of the sensor cover 102d becomes separated upwards from the sensor section 102a, the smaller the foreign object adhering to the sensor cover 102d is shown on an image of the sensor section 102a. Therefore, the influence of the adhesion of the foreign object can be reduced.

The sensor cover 102d has a connecting section for connecting to the sensor cover 102d of an adjacent image sensor chip 102, as illustrated in FIG. 8(b). The connecting section is cut off at the time of dicing. All the chips on a wafer are formed as one body by the connection section connecting with the sensor cover 102d.

In addition, in order to maintain the optical accuracy, the sensor cover 102d is not provided at a contacting part of the lens tube 101b and the image sensor chip 102 such that the lens tube 101b and the image sensor chip 102 directly contact with each other. Instead, an opening (spaced) of the sensor 102d is provided. Similarly, in order to facilitate the wiring, the sensor cover 102d is not provided above the bonding pad 102c, and instead, the opening of the sensor cover 102d is provided.

According to Reference 1 as described above, the four bottom surfaces of the lower end portion of the lens tube 101b, to which the lens 101a is fixed, are placed and fixed to the image sensor chip 102, so that the distance is accurately defined between the lens 101a and the sensor section 102a. Further, according to Reference 1, additional values, such as an "IR cut filter", a "diaphragm" and a "low pass filter", are added to the sensor cover 102d itself, and four through holes (spaces d through which legs extending from the bottom surface of the lens tube 101b pass) are provided to the sensor cover 102d. Further, legs extend from the bottom surface of the lens tube 101b and directly touch the image sensor chip 102, so that the distance is accurately defined between the lens 101a and the sensor section 102a.

Next, an image capturing module according to Reference 2 will be described in detail with reference to FIG. 9. In Reference 1, the lens tube 101b intervenes between the lens 101a and the sensor section 102a. On the other hand, Reference 2 discloses a way to accurately define the distance between a lens and an image capturing element by extending a portion of a lens part for a focal distance (distance to a sensor) and press the tip portion extending from the lens part to a chip image sensor.

FIG. 9 is a longitudinal cross sectional view schematically illustrating an exemplary essential structure of a conventional image capturing apparatus disclosed in Reference 2.

In FIG. 9, a conventional image capturing apparatus 200 includes: a substrate 201; an image capturing element 202 positioned on one surface of the substrate 201; an optical member 203 for focusing light and forming an image of a subject in an image capturing area of the image capturing element 202; a lens frame (holder member) 204 for covering the optical member 203 and the image capturing element 202; a rotating member 205 provided on an upper surface (front portion) of the lens frame 204 and equipped with a magnet; a light shielding plate 206 provided below the rotating member 205 and for shielding light; an aperture plate 207 provided below the light shielding plate 206 and for adjusting the amount of light entering the optical member 203; an IR cut filter 208 supported by the shielding plate 206 and the aperture plate 207; a pressing member 209 that is a spring that presses the optical member 203 towards the substrate 201 side and is provided inbetween the aperture plate 207 and the optical member 203; and a position-determining electric part 210 for determining a position of the lens frame 204. The rotating member 205, the shielding plate 206, the aperture plate 207 and the IR cut filter 208 are defined as an upper end portion 211 (front portion of the holder member) of the lens frame 204.

Transparent glass or plastic material is used for the optical member 203, and the optical member 203 is configured of a first lens member 212 positioned on the substrate 201 side (back of an optical axis direction), a second lens member 213 provided above the first lens member 212, an aperture portion 214 provided in between the first lens member 212 and the second lens member 213 and for adjusting the amount of light entering the first lens member 212. The optical axes of the first lens member 212 and the second lens member 213 are identical to each other.

The first lens member 212 includes a convex shaped first lens portion 212a and a tubular lower leg portion 212b around the first lens portion 212a. In a normal image capturing mode, a touching portion 212c is formed for touching a surface of the image capturing element 202 at a lower end portion of the lower leg portion 212b. In addition, the pressing member 209 touches an upper surface of the lower leg portion 212b. In a normal image capturing mode, the first lens member 212 is pressed to the substrate 201 side by the pressing force (bias force) of the pressing member 209. Further, a collar portion 212d is formed in a circular shape in a plan view from the tubular lower leg portion 212b towards the outside. Although the focal distance of the first lens member 212 is a distance from the principal point of the lens, in terms of parts measurement, the distance and measure from a flat surface position of the collar portion 212d to the touching portion 212c at a lower end of the lower leg portion 212b are controlled by manufacturing the tolerance.

As a result, part of the first lens member 212 is extended to the position of the focal distance (distance to a sensor) and a tip portion (touching portion 212c at the lower end) of the lower leg portion 212b extending from a lower surface of the first lens member 212, is pressed to the surface of the image capturing element 202. The first lens member 212 and the image capturing element 202 can be positioned so that the distance can be set in a highly accurate manner between the first lens member 212 and the image capturing element 202.

Next, Reference 3 discloses a camera module, in which an image capturing element chip is positioned on a substrate and a tubular holder having a lens therein covering the image capturing element chip. In order to determine the distance between the lens and the image capturing element chip, a lower surface of a protruding portion protruding from the holder is adhered to a surface of the image capturing element chip via adhesive.

Reference 4 discloses a method for manufacturing the camera module according to Reference 3. In this case, a projection portion of the holder is drawn near to the upper surface of the image capturing element chip via adhesive while checking the focusing state of the lens. Subsequently, the position of the holder is determined at the position where the lens is focused on the image capturing element and the adhesive is dried.

Further, Reference 5 discloses a camera module, the camera module including an image capturing chip being positioned on a substrate, a ceiling surface portion positioned on the image capturing element chip, a protrusion portion protruding from the ceiling surface portion to the image capturing element chip side, where the upper surface of the image capturing element chip and the ceiling surface portion are fixed via adhesive in a state where the protrusion portion is touching the upper surface of the image capturing element chip.

Reference 1: Japanese Laid-Open Publication No. 2004-260356

Reference 2: Japanese Laid-Open Publication No. 2004-266340

Reference 3: Japanese Laid-Open Publication No. 2007-184801

Reference 4: Japanese Laid-Open Publication No. 2007-150428

Reference 5: Japanese Laid-Open Publication No. 2007-259064

SUMMARY OF THE INVENTION

However, according to the conventional image capturing module 100 described above, additional values, such as the "IR cut filter", "aperture" and "low pass filter" are provided to the sensor cover 102d as one body, the sensor cover 102d above the sensor section 102a is required to be formed of an optical material that is similar to a lens capable of passing light. Further, the sensor cover 102d other than above the sensor section 102a is required to be shielded from light. However, when the inside of the circle inside the space d passes light and the outside of the circle is shielded from light, as illustrated in FIGS. 8(a) and 8(b), it is difficult, in terms of manufacturing, to shield only the portion where the leg extends in a lower direction in order to prevent light from the side direction from entering the sensor section 102a. Further, the through holes (spaces d) are provided with the sensor cover 102d so that the lower end portions, which are separated into four, of the lens tube 101b touch the image sensor chip 102. There is a high possibility of leakage of light in a transverse direction through the spaces d to the sensor section 102a, and a ghost/flare may occur. Further, accurate measurement is also required in X and Y directions in order to position the lens tube 101b on the image sensor chip 102 and position the optical axis of the lens 101a at the center of the sensor section 102a. In practice, although the four lower end portions of the lens tube 101b are allowed to pass through the through holes (spaces d) of the sensor cover 102d, the lower end portions will not smoothly enter the through holes if there is not enough room in the measurements (clearance greater than or equal to a predetermined measurement) between the lower end portion and the through holes (spaces d). If the room is too large, the measurement accuracy in the X and Y directions will be loose. In manufacturing them, there are great numbers of parts and the structures are complicated. Further, there are many items to be controlled, a great deal of man-hours are also required, and the accuracy for assembling tends to have a problem.

According to the conventional image capturing apparatus 200, for the positional determination in a Z axial direction, the lower leg portion 212b, which extends from the lower surface of the first lens member 212, is directly placed to the image capturing element 202, and the distance is determined in a highly accurate manner between the first lens member 212 and the surface of the image capturing element 202. As a result, the assembling accuracy is improved. Since the structure of the metal mold will be complicated, accuracy will be required in order to obtain a predetermined level of a lens performance. Further, since the pressing force (bias force) is constantly required to the sensor chip (image capturing element 202) side by the pressing member 209 (spring), the pressing member 209 (spring) is positioned on the upper surface of the first lens member 212 and another member for pressing and holding the pressing member 209 (spring) is also required. As a result, the number of the parts will increase and the structure will be complicated. Therefore, there are many items to be controlled, a great deal of man-hours are also required, and the accuracy for assembling tends to have a problem. Further, the conventional image capturing apparatus 200 requires the focusing adjustment of the lens position of the first lens member 212 in order to absorb the accuracy of the parts and the assembling accuracy in assembling the image capturing module.

Further, according to the camera module in References 3 to 5, adhesive lies among the upper surface of the image capturing element chip, the protruding portion of the holder and the ceiling surface portion. The adhesive layers largely vary from 5 to 25 μm in thickness, and therefore, the distance cannot be accurately determined between the lens in the holder and the image capturing element chip. It is not possible to omit the optical adjustment for improving the yield and the light focusing efficiency.

The present invention is intended to solve the conventional problems described above. The objective of the present invention is to provide an image capturing module, where the structure is simpler by reducing the number of constituent parts, resulting in the reduction of the man-hours for assembling, the improvement on the assembling accuracy, and disposing of the optical adjustment; a method for manufacturing the image capturing module; and an electronic information device using the image capturing module as an image input device, such as a car-mounted back monitoring camera, in an image capturing section thereof.

An image capturing module according to the present invention includes a holder member, which accommodates therein a focusing lens for forming an image of a subject light on an image capturing chip attached on a substrate and is attached to the substrate to cover the image capturing chip, wherein the holder member is directly supported on a surface of the image capturing chip, thereby achieving the objective described above.

Furthermore, an image capturing module according to the present invention includes a holder member, where an image capturing chip is attached to a substrate and a focusing lens for forming an image of a subject light on the image capturing chip is accommodated inside a cavity portion on a back side, the holder member being attached to the substrate to cover the image capturing chip by the cavity portion on the back side to make the inside of the cavity portion on the back side sealed or semi-sealed, wherein a step portion provided inside the cavity portion on the back side is provided with a height direction position determination section that directly touches a surface of the image capturing chip, thereby achieving the objective described above.

Furthermore, an image capturing module according to the present invention includes a holder member, which accommodates therein a focusing lens for forming an image of a subject light on an image capturing chip attached on a substrate, is attached to the substrate to cover the image capturing chip, wherein three points of the holder member are supported on a surface of the image capturing chip, thereby achieving the objective described above.

Furthermore, an image capturing module according to the present invention includes a holder member, where an image capturing chip is attached to a substrate and a focusing lens for forming an image of a subject light on the image capturing chip is accommodated inside a cavity portion on a back side, the holder member being attached to the substrate to cover the image capturing chip by the cavity portion on the back side to make the inside of the cavity portion on the back side sealed or semi-sealed, wherein a step portion provided inside the cavity portion on the back side is provided with a height direction position determination section that touches a surface of the image capturing chip in three points, thereby achieving the objective described above.

Preferably, in image capturing module according to the present invention, a part of the holder member directly supported on the surface of the image capturing chip is defined as a height direction position determination section for the focusing lens and the surface of the image capturing chip.

Still preferably, in an image capturing module according to the present invention, the height direction position determination section is a part or all of the surface of the step portion, or a protruding portion protruding from the step portion in a flat surface or pointed shape.

Still preferably, in an image capturing module according to the present invention, the protruding portion has a tip surface, which touches the surface of the image capturing chip, formed in a circular shape or an ellipse shape.

Still preferably, in an image capturing module according to the present invention, the plurality of protruding portions are provided, and the protruding portions touch a surface other than an image capturing area of the image capturing chip in a plurality of points.

Still preferably, in an image capturing module according to the present invention, the three points are defined to be a height direction position determination section for the focusing lens and the surface of the image capturing chip.

Still preferably, in an image capturing module according to the present invention, the height direction position determination section is a protruding portion protruding in a pointed shape.

Still preferably, in an image capturing module according to the present invention, the protruding portion has a tip surface, which touches the surface of the image capturing chip, formed in a circular shape.

Still preferably, in an image capturing module according to the present invention, the protruding portion has a tip surface touching a surface other than an image capturing area of the image capturing chip.

Still preferably, in an image capturing module according to the present invention, the step portion is formed to avoid a deformed portion of a surface end edge of the image capturing chip due to a dicing edge surface.

Still preferably, in an image capturing module according to the present invention, the step portion is formed to protrude by avoiding a deformed portion of a surface end edge of the image capturing chip due to a dicing edge surface.

Still preferably, in an image capturing module according to the present invention, the focusing lens is positioned on a bottom surface inside the cavity portion on the back side of the holder member and accommodated, and a side wall inside the cavity portion on the back side is adhered and fixed to an outer circumference end surface of the focusing lens.

Still preferably, in an image capturing module according to the present invention, the focusing lens is a coupling lens of two lenses, and a light shielding film having a light passing hole provided in a middle portion thereof is held between the two lenses.

Still preferably, in an image capturing module according to the present invention, an infrared ray cut filter is provided inside the holder member in such a manner to traverse above the image capturing chip, the infrared ray cut filter cutting infrared rays from incident light that has passed the focusing lens and outputting the incident light to the side of the image capturing chip.

Still preferably, in an image capturing module according to the present invention, a part or all of the surface of the step portion on the back surface of the holder member is defined as a height direction position determining section that is directly placed on the image capturing chip without interposing adhesive.

Still preferably, in an image capturing module according to the present invention, the height direction position determining section touches the surface of the image capturing chip by two surface touch or three surface touch by a part or all of the surface of the step portion.

Still preferably, in an image capturing module according to the present invention, a step is provided as the height direction position determining section from the bottom surface of the cavity portion, which is a lens accommodating reference surface, of the holder member, without interposing any other steps.

A method for manufacturing an image capturing module according to the present invention includes: a sensor unit forming step of attaching an image capturing chip to a substrate; a lens unit forming step of accommodating and fixing a focusing lens for forming an image of a subject light on the image capturing chip, inside a cavity portion on a back side of a holder member, the lens unit forming step and the sensor unit forming step being performed either in this order or in a reverse order; and a sensor unit and lens unit coupling step of allowing a height direction position determining section of a step portion provided inside the cavity portion on the back side to directly touch a surface of the image capturing chip and covering the image capturing chip by the cavity portion on the back side, and further, in this state, adhering the holder member to the substrate to seal or semi-seal the cavity portion on the back side, thereby achieving the objective described above.

A method for manufacturing an image capturing module according to the present invention includes: a sensor unit forming step of attaching an image capturing chip to a substrate; a lens unit forming step of accommodating and fixing a focusing lens for forming an image of a subject light on the image capturing chip, inside a holder member, the lens unit forming step and the sensor unit forming step being performed either in this order or in a reverse order; and a sensor unit and lens unit coupling step of allowing a height direction position determining section provided in the inside to directly touch a surface of the image capturing chip and covering the image capturing chip, and further, in this state, adhering the holder member to the substrate to seal or semi-seal the inside, thereby achieving the objective described above.

Preferably, in a method for manufacturing an image capturing module according to the present invention, the sensor unit forming step mounts the image capturing chip on a predetermined position on the substrate, wire-bonds a plurality of input and output pads of the image capturing chip and predetermined terminals of the substrate, and fixes the image capturing chip to the substrate.

Still preferably, in a method for manufacturing an image capturing module according to the present invention, the lens unit forming step inserts and positions the focusing lens into a bottom surface of the cavity portion on the back side of the holder member, and further, in this state, adheres and fixes an inner circumference wall of the cavity portion on the back side of the holder member to an outer circumference end surface of the focusing lens.

Still preferably, in a method for manufacturing an image capturing module according to the present invention, the sensor unit and lens unit coupling step aligns the holder member, which accommodates the focusing lens, with the image capturing chip, which is attached to the substrate, by an automated assembling apparatus for recognizing a plane image of the image capturing chip and directly places the holder member on the image capturing chip.

An electronic information device according to the present invention uses the image capturing module according to the present invention as an image input device in an image capturing section, thereby achieving the objective described above.

The functions of the present invention having the structures described above will be described hereinafter.

The structure for determining the position of the holder member to the substrate can be changed into a simple structure with a significantly smaller number of parts of the image capturing module compared to the prior art by directly placing a height-direction position determining section of the holder member to the surface of the sensor chip, which functions as an image capturing chip, and determining the position. With respect to the upper surface of the sensor chip, the lens fixed to the holder member can be positioned such that the distance in the vertical direction (z axial direction) between the lens and the sensor chip is accurately fixed. As a result, the accuracy for the parts, the assembly and the implementation are improved, thereby achieving a focus-adjustment free image capturing module. In this structure, the surface of the sensor chip and the height direction determining section are not adhered to each other and there is no adhesive interposing therebetween. The distance does not significantly vary ranging between 5 to 25 μm due to the adhesive layer, thereby achieving finer assembling with finer accuracy.

In addition, the structure for determining the position of the holder member to the substrate can be changed into a simple structure with significantly smaller number of parts of the image capturing module compared to the prior art by directly placing three points of the height direction position determining section of the holder member to the surface of the sensor chip, which functions as an image capturing chip and determining the position. With respect to the upper surface of the sensor chip, the lens fixed to the holder member can be positioned such that the distance in the vertical direction (z axial direction) between the lens and the sensor chip is accurately fixed. In this case, the three points of the height direction position determining section all certainly touch the upper surface of the sensor chip without floating in midair, thereby achieving a finer accuracy for determining the position in the height direction. As a result, the accuracy for the parts, the assembly and the implementation are improved, thereby achieving a focus-adjustment free image capturing module. Further, at the assembling, the substrate having a sensor chip attached thereon is accurately set by mating with position determining pins, and the holder member integrated with a lens is positioned and attached to the sensor chip and substrate, which are set with high accuracy, by an automated assembling apparatus, so that the occurrence of offset in a plane direction (X and Y directions) can be controlled to its minimum and the position can be determined with high accuracy. Further, according to a new structure of the present invention, the sensor chip fixed to the substrate is sealed by the holder member integrated with a lens such that the inside is covered from the top, so that the leakage of light will not occur from the outside to the inside. Since this is a sealed structure, no dust enters the inside and no dust adheres to an inside image capturing area of the sensor chip. Therefore, the quality of the image can be improved.

The holder member integrated with a lens is positioned and attached to the substrate having a sensor chip attached thereon by the automated assembling apparatus that recognizes a plane image of an appropriate sensor chip, so that the occurrence of an offset in a plane direction (X and Y directions) can be controlled at its minimum and the position can be determined with high accuracy.

Further, according to a new structure of the present invention, the sensor chip fixed to the substrate is sealed by the holder member integrated with a lens such that the inside is covered from the top, so that the leakage of light will not occur from the outside to the inside. Since this is a sealed structure, no dust enters the inside and no dust adheres to an inside image capturing area of the sensor chip. Therefore, the quality of the image can be improved.

According to the present invention with the structure described above, the height direction position determining section is directly placed on the upper surface of the image capturing chip as a reference surface of the holder member to determine the position in the height direction. Some variation factors may be conceivable with respect to the accuracy of assembling a focusing lens to the holder member and the accuracy of casting the holder member. However, the present invention has the smaller number of parts compared to the conventional structures and has a simple structure. Therefore, the man-hours of assembling can be reduced and the assembling accuracy can be improved, achieving no needs for focus adjustment. In this case, the three points of the height direction position determining section all certainly touch the upper surface of the sensor chip without floating in midair, thereby achieving a finer accuracy for determining the position in the height direction. Further, the surface of the sensor chip and the height direction determining section are not adhered to each other and there is no adhesive interposing therebetween. Therefore, the assembly can be conducted with more accurate distance between the lens and the sensor chip, achieving no needs for focus adjustment.

These and other advantages of the present invention will become apparent to those skilled in the art upon reading and understanding the following detailed description with reference to the accompanying figures.

BRIEF DESCRIPTION OF THE DRAWINGS

FIG. 8(a) is a longitudinal cross sectional view of the conventional image capturing module and FIG. 8(b) is a top view of the conventional image capturing module.

FIG. 10(a) is a top view schematically illustrating an exemplary essential structure of an image capturing module according to Embodiment 4 of the present invention. FIG. 10(b) is a longitudinal cross sectional view along the line A-A in FIG. 10(a). FIG. 10(c) is a top view of the image capturing module in FIG. 1 for comparison with FIG. 10(a). FIG. 10(d) is a longitudinal cross sectional view along the line B-B in FIG. 10(c).

FIG. 11(a) is a back view of a holder member in FIG. 10(a). FIG. 11(b) is a back view of a holder member in the image capturing module in FIG. 1 or 4, for a comparison with FIG. 11(a).

Figure 1:
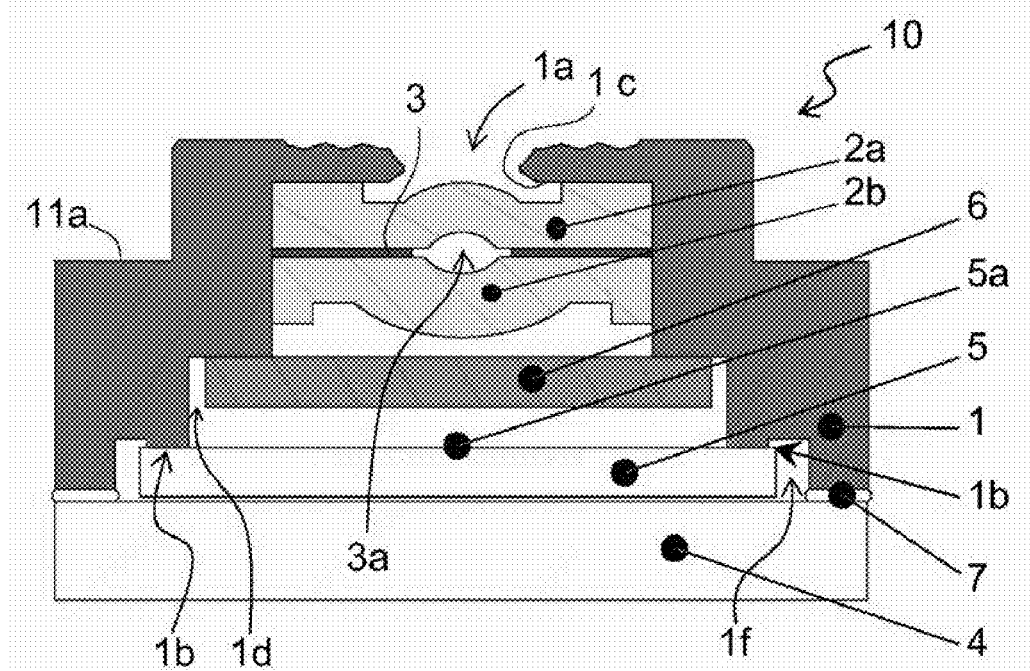
FIG. 1 is a longitudinal cross sectional view schematically illustrating an exemplary essential structure of an image capturing module according to Embodiment 1 of the present invention.

1, 1A, 1C, 1D holder member
1a circular hole (transparent circular area)
1b, 1bA, 1bB, 1bB1, 1bB2, 1bC height direction position determining section (protruding portion or step portion)
1c bottom surface inside a cavity portion on the back side
1d first step portion
1f second step portion
2a first focusing lens
2b second focusing lens
3 light shielding film
4 substrate
5 sensor chip (image capturing chip)
5a image capturing area
6 IR cut filter
7 adhering section
7a adhesive
10, 10A, 10B, 10C, 10D image capturing module
11 lens unit
11a outer step
12 sensor unit
20 electronic information device
21 memory section
22 display section
23 communication section
24 image output section

DESCRIPTION OF THE PREFERRED EMBODIMENTS

Hereinafter, Embodiments 1 to 4 of an image capturing module according to the present invention, and Embodiment 5 of an electronic information device using the image capturing module according to any one of Embodiments 1 to 4 of the present invention as an image input device in an image capturing section thereof, will be described in detail with reference to accompanying figures.

(Embodiment 1)

FIG. 1 is a longitudinal cross sectional view schematically illustrating an exemplary essential structure of an image capturing module according to Embodiment 1 of the present invention.

In FIG. 1, an image capturing module 10 according to Embodiment 1 includes: a holder member 1 functioning as a dustproof case; a first focusing lens 2a and a second focusing lens 2b vertically accommodated in the holder member 1; a light shielding film 3 provided in between the first focusing lens 2a and the second focusing lens 2b; a substrate 4; a sensor chip 5 provided on the substrate 4 and for functioning as a solid-state image capturing chip; an IR cut filter 6 fixed to a first step portion 1d inside the holder member 1 and positioned by traversing between the second focusing lens 2b and the sensor chip 5; and an adhering section 7 for adhering a bottom surface of an outer wall of the holder member 1 to the substrate 4.

The dustproof holder member 1 has a structure to cover the first focusing lens 2a, the light shielding film 3, the second focusing lens 2b, the IR cut filter 6 and the sensor chip 5, which are positioned respectively from the top, together with the substrate 4 to create sealed or semi-sealed inside. The holder member 1 is provided with a step 11a as an external appearance, and an upper portion of the step 11a is a cylinder shape and a lower portion thereof is a square pipe shape, and further, a lower surface is opened. The holder member 1 is configured with a resin casing that has a thin outer wall and is capable of shielding the inside from light and sealing or semi-sealing the inside, and a circular hole 1a (or circular transparent area) is formed on the upper surface of the casing, namely on the upper surface of the cylinder shape above the step, as a first circular hole for allowing incident light to pass, opposing the first focusing lens 2a. In order for the optical axis of the first focusing lens 2a and the second focusing lens 2b to pass the center of the circular hole 1a, the first focusing lens 2a, the light shielding film 3 and the second focusing lens 2b can be positioned by inserting and fixing the respective circular external shapes to circular cavity portions of the holder member 1 in this order from the back of the opened lower surface of the holder member 1.

In the dustproof holder member 1, the height direction position determining section 1b, which is placed on the sensor chip 5 by the weight of the holder member 1, is protruding with a flat surface from a second step portion 1f on the back surface of the holder member 1 so as to focus incident light on an image capturing area 5a and capture an image by the first focusing lens 2a and the second focusing lens 2b. The height direction position determining section 1b of the holder member 1 touches the sensor chip 5, so that the distance in the height direction (z axial direction) is accurately defined between the first and second focusing lenses 2a and 2b and the image capturing area 5a of the sensor chip 5. That is, the distance in the height direction between the bottom surface of the cavity portion on the back surface side of the holder member 1, in which the first focusing lens 2a and the second focusing lens 2b are accommodated and positioned, and the end surface of the height direction position determining section 1b, which is protruded from a second step portion 1f of the holder member 1, can be accurately controlled within the manufacturing the tolerance of parts. As a result, the holder member 1 can be directly positioned on the upper surface of the sensor chip 5 by the height direction position determining section 1b with a flat surface, and the distance can be accurately determined in the vertical direction (z axial direction) between the first and second focusing lenses 2a and 2b, which are fixed to the holder member 1, and the upper surface of the sensor chip 5. As a result, the accuracy for the parts, the assembly and the implementation are improved, thereby achieving a focus-adjustment free image capturing module 10.

The first focusing lens 2a and the second focusing lens 2b form a coupling lens for focusing light of the subject on the image capturing area 5a of the sensor chip 5 to form an image, which are configured of materials, such as transparent acrylic plastic material and glass material.

The light shielding film 3, colored black for reflection preventing treatment, is interposed between the lower surface (flat surface) on the outer circumference side of the first focusing lens 2a and the upper surface (flat surface) on the outer circumference side of the second focusing lens 2b, and is provided with a circular hole 3a (or circular transparent area), which has a smaller diameter than the diameter of the circular hole 1a at the middle portion of the upper surface of the holder member 1 and which functions as a second circular hole for passing incident light, in a concentric circular manner with the circular hole 1a of the holder member 1. The circular hole 3a (or circular transparent area) is an aperture for preventing a flare from occurring. That is, the circular hole 3a is set to have an opening size that does not generate a flare in view of the lens characteristics of the first focusing lens 2a and the second focusing lens 2b. For example, the opening size is set such that oblique light having an inclination of 50 to 60 degrees with respect to incident light in the vertical direction (height direction) is radiated and a level (level of diffusely reflected noise) of an image capturing signal due to the oblique light is set to be a level smaller than a predetermined standard value (degree of roughness on a display screen and the like).

The sensor chip 5 includes a solid-state image capturing element in the center image capturing area 5a, the solid-state image capturing element including a plurality of photoelectric conversion sections (a plurality of light receiving sections) formed in a matrix for performing photoelectric conversions on incident light from the subject, which has passed the first focusing lens 2a and the second focusing lens 2b, to form an image. The solid-state image capturing element can be applied for both a CMOS image sensor and a CCD image sensor. In the CMOS image sensor, a signal readout circuit is provided for each unit pixel section, each of which is connected to each other by a multilayer wiring layer, and which is related to selecting a photoelectric conversion section and outputting a signal from the photoelectric conversion section. In the CCD image sensor, a plurality of photoelectric conversion sections are provided in two dimensions on a light receiving surface of an image capturing area. A signal charge photoelectrically converted in a photoelectric conversion section is read out to a charge transfer section CCD and is consecutively transferred in a predetermined direction. Subsequently, the signal charge is consecutively detected, not for each light receiving section but as a whole, in a charge detection section, and the signal charge is amplified as an image capturing signal and is outputted.

The infrared rays (IR) cut filter 6 is put across the first step sections 1d of the holder member 1 and fixed, traversing above the sensor chip 5, for cutting infrared rays from the incident light that has passed the first focusing lens 2a and the second focusing lens 2b.

A method for manufacturing the sensor module 10 with the structure described above will be described.

Figure 2:
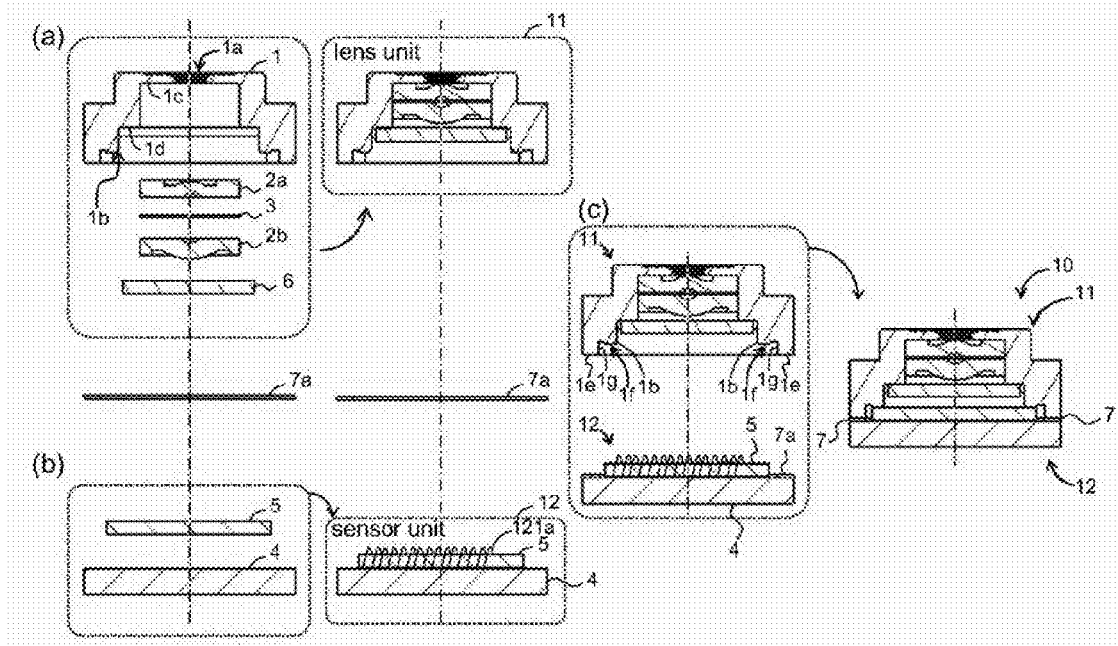
FIG. 2 is a longitudinal cross sectional view schematically illustrating each manufacturing step of a method for manufacturing the image capturing module of FIG. 1.

FIG. 2 is a longitudinal cross sectional view schematically illustrating each manufacturing step of a method for manufacturing the image capturing module of FIG. 1.

As illustrated in a step of manufacturing a lens unit in FIG. 2(a), the first focusing lens 2a is inserted to the end into and positioned at the bottom surface 1c of the cavity portion on the back side of the holder member 1 having the circular hole 1a (or a circular transparent area) at the center. Subsequently, the light shielding film 3 having the circular hole 3a at the center is inserted to the flat surface portion of the outer circumference of the first focusing lens 2a, and further, the second focusing lens 2b is inserted from above the light shielding film 3. Adhesive is inserted between the second focusing lens 2b and the inner circumference surface of the cavity portion of the holder member 1 to be fixed. Further, the infrared rays (IR) cut filter 6 is put across the first step portions 1d of the cavity portion on the back side of the holder member 1 and is fixed. As a result, a lens unit 11 can be manufactured, the lens unit 11 including the first focusing lens 2a, the light shielding film 3, the second focusing lens 2b, and the infrared rays (IR) cut filter 6 accommodated in the inside respective predetermined positions.

Next, as illustrated in a step of manufacturing a sensor unit in FIG. 2(b), the sensor chip 5 is mounted on a predetermined position on the substrate 4, and a plurality of input and output pads (not shown), which are arranged along opposing edges (two edges) of the sensor chip 5, and predetermined terminals (not shown) of the substrate 4 are wire-bonded by a wire 121 so as to fix the sensor chip 5 on the substrate 4. As a result, a sensor unit 12, in which the sensor chip 5 is attached to the substrate 4, can be manufactured.

Figure 3:
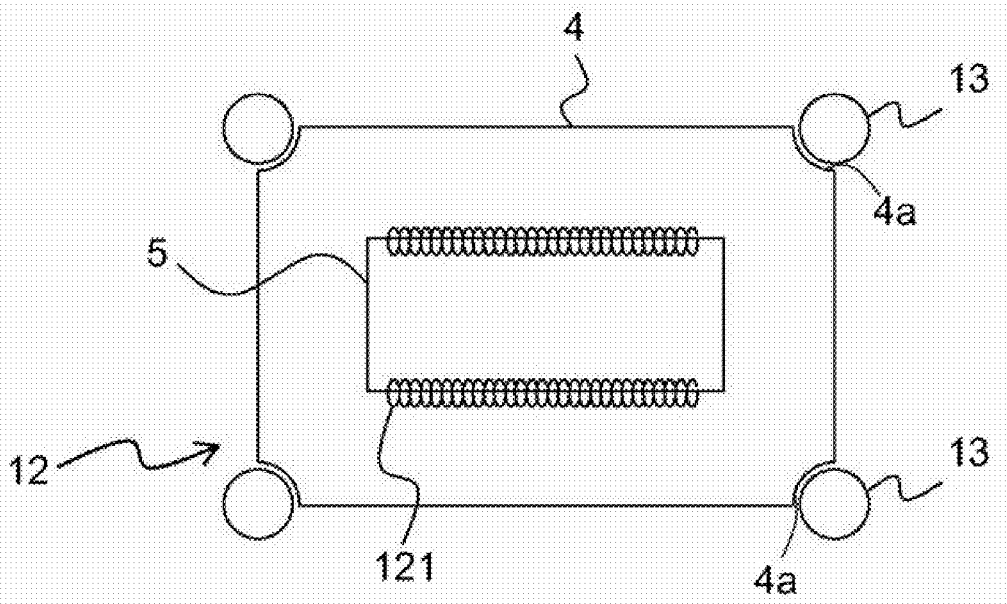
FIG. 3 is a schematic plan view illustrating a step of coupling a sensor unit and lens unit of the image capturing module in FIG. 2(c).

Subsequently, as illustrated in a step of coupling the final sensor unit and lens unit of the image capturing module 10 in FIG. 2(*c*) and FIG. 3, pins 13 stand at four corners of a frame member (not shown), and notches 4*a* are formed at four corners on the receiving side of the substrate 4, as well. The pins 13 are allowed to pass through the notches 4*a* of the substrate 4 so as to prevent shifting in plane (X and Y) directions. As a result, the substrate 4 having the sensor chip 5 mounted thereon is positioned with respect to the automated assembling apparatus (not shown). A plan view image of the sensor chip 5 is recognized by an image recognizing function of the automated assembling apparatus, and initially, adhesive 7*a* is applied to a predetermined position (position corresponding to the lower end portion 1*e* of the outer wall of the holder member 1) on the substrate 4 by the automated assembling apparatus. Further, the lens unit 11 is accurately and precisely mounted on the sensor unit 12 by the automated assembling apparatus. Thus, the frame member (not shown) and the pins 13 at the four corners are used in order to fix the sensor unit 12 and the lens unit 11 until the adhesive 7*a* cures, allowing no shifting.

In this case, with respect to the positioning in the height direction (z axial direction), the height direction position determining section 1*b* in a shape of a flat surface, which is protruded from the second step portion 1*f* on the back surface of the holder member 1, is directly placed on the surface of the sensor chip 5 by the weight of the holder member 1. As a result, the distance can be accurately determined in the height direction between the first and second focusing lenses 2*a* and 2*b* maintained in the holder member 1 and the image capturing area 5*a* of the sensor chip 5.

The sensor chip 5 is a silicon chip, and it is difficult to add hollows on the surface. Therefore, the positioning accuracy in plane (X and Y) directions is performed in a highly accurate manner by the placement by the image recognizing function of the automated assembling apparatus. In addition, the insertion will be further facilitated by adding a taper portion 1*g* for guiding the height direction position determining section 1*b* to the surface of the sensor chip 5, on a side wall extending to the second step portion 1*f* on the back surface of the holder member 1. The sensor chip 5 is about 0.2 mm in thickness and is therefore thin. As described above, the chip shape on the substrate 4 is recognized as an image by the automated assembling apparatus (not shown), and the holder member 1 is placed from above to the sensor chip 5. Therefore, the pin 13 may nor may not be used in reality. The wire 121 is wire-bonded to two opposing edges, and therefore, the height direction position determining section 1*b* is mounted on the end of the chip edges of two opposing edges other than the two wire-bonded edges. At this stage, the lower end portion 1*e* on the side wall of the outer periphery of the holder member 1 is set to be slightly distant (about 0.2 μm, for example) from the surface of the substrate 4. The adhesive 7*a* is inserted into the distant space to be the adhering section 7, and the adhering section 7 makes the inside of the holder member 1 in a sealed state or a semi-sealed state (where the adhesive 7*a* is not inserted completely in the distant space and the inside and outside of the holder member 1 are connected through a partial opening). As a result, the image capturing module 10, which is formed accurately in plane (X and Y) directions, can be manufactured.

According to Embodiment 1 as described above, the structure for determining the position of the holder member 1 to the substrate 4 can be changed into a simple structure with significantly smaller number of parts of the image capturing module 10 compared to the prior art by directly placing a portion (height-direction position determining section 1*b*) of the holder member to the surface of the sensor chip 5. The distance in the vertical direction (z axial direction) can be accurately fixed between the lenses and the sensor chip 5. As a result, the accuracy for the parts, the assembly and the implementation are improved, thereby achieving a focus-adjustment free image capturing module. In addition, at the assembling, the substrate having a sensor chip attached thereon is accurately set by mating with position determining pins, and the holder member integrated with a lens is positioned and attached to the sensor chip and substrate, which are set with high accuracy, by an automated assembling apparatus, so that the occurrence of an offset in a plane direction (X and Y directions) can be controlled to be minimal and the position can be determined with high accuracy. Further, according to a new structure of the present invention, the sensor chip 5 fixed to the substrate is sealed by the holder member integrated with a lens such that the inside is covered from the top, so that the leakage of light will not occur from the outside to the inside. Since this is a sealed structure, no dust enters the inside and no dust adheres to an inside image capturing area of the sensor chip. Therefore, the quality of the image can be improved.

(Embodiment 2)

In Embodiment 1 described above, a case has been described where the height direction position determining section 1*b* with a flat surface of the holder member 1 is directly placed on the upper surface of the sensor chip in order to accurately determine the distance between the lens fixed to the holder member 1 and the upper surface of the sensor chip 5. In Embodiment 2, a case will be described where the height direction position determining section 1*b* is received as a shape of a point (circular shape or ellipse shape) on the upper surface of the sensor chip 5, instead of being received as the shape of a flat surface.

Figure 4:
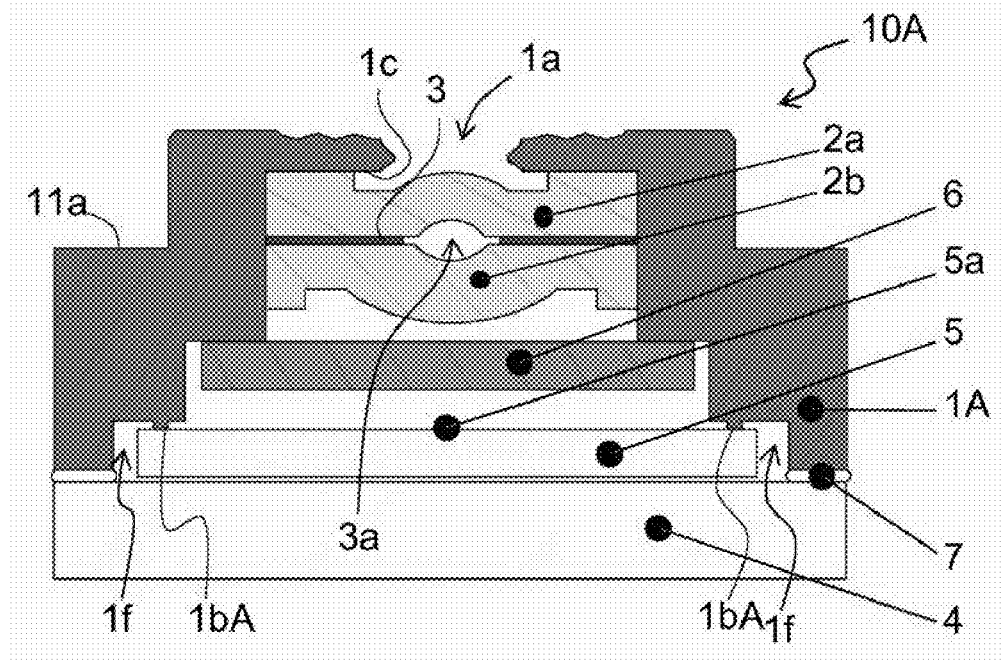
FIG. 4 is a longitudinal cross sectional view schematically illustrating an exemplary essential structure of an image capturing module according to Embodiment 2 of the present invention.

FIG. 4 is a longitudinal cross sectional view schematically illustrating an exemplary essential structure of an image capturing module according to Embodiment 2 of the present invention.

In FIG. 4, an image capturing module 10A according to Embodiment 1 includes: a holder member 1A functioning as a dustproof case; a first focusing lens 2*a* and a second focusing lens 2*b* vertically attached to the holder member 1A; a light shielding film 3 provided in between the first focusing lens 2*a* and the second focusing lens 2*b*; a substrate 4; a sensor chip 5 provided on the substrate 4; an IR cut filter 6 fixed to a first step portion 1*d* inside the holder member 1A and positioned by traversing between the second focusing lens 2*b* and the sensor chip 5; and an adhering section 7 between the holder member 1A and the substrate 4.

The dustproof holder member 1A has a structure to cover the first focusing lens 2*a*, the light shielding film 3, the second focusing lens 2*b*, the IR cut filter 6 and the sensor chip 6, which are positioned respectively from the top, together with the substrate 4 to create a sealed or a semi-sealed inside. The holder member 1A is provided with a step 11*a* as an external appearance, and an upper portion of the step 11*a* is a cylinder shape and a lower portion thereof is a squared pipe shape, and further, a lower surface is opened in a cavity shape. The holder member 1A is configured with a resin casing that has a thin outer wall and is capable of shielding the inside from light and sealing or semi-sealing the inside, and a circular hole 1*a* (or circular transparent area) is formed on the upper surface of the casing, namely on the upper surface of the cylinder shape above the step, as a first circular hole for allowing incident light to pass, opposing the first focusing lens 2*a*. In order for the optical axis of the first focusing lens 2*a* and the second focusing lens 2*b* to pass the center of the circular hole 1*a*, the first focusing lens 2a, the light shielding film 3 and the second focusing lens 2b can be positioned by inserting and fixing the respective circular external shapes to circular cavity portions of the holder member 1A in this order from the back of the opened lower surface of the holder member 1A.

In the dustproof holder member 1A, the height direction position determining section 1bA, which is in a circular pointed shape and is placed on the sensor chip 5 by the weight of the holder member 1A, is protruded with a circular point from a second step portion 1f on the back surface of the holder member 1 so as to focus incident light on an image capturing area 5a and capture an image by the first focusing lens 2a and the second focusing lens 2b. In this case, the height direction position determining section 1bA described above is provided at a position that corresponds to the vicinities of the four corners on the rectangular upper surface of the sensor chip 5. The height direction position determining section 1bA of the holder member 1A touches the sensor chip 5 at the time of assembling, so that the distance in the height direction (z axial direction) is accurately defined between the first and second focusing lenses 2a and 2b and the image capturing area 5a of the sensor chip 5. That is, the distance in the height direction between the bottom surface 1c of the cavity portion on the back surface side of the holder member 1A, in which the first focusing lens 2a and the second focusing lens 2b are accommodated and positioned, and the circular point of the height direction position determining section 1bA, which is protruded from a second step portion 1f of the holder member 1A, can be accurately controlled within the manufacturing the tolerance of parts As a result, the holder member 1A can be directly positioned on the upper surface of the sensor chip 5 by the height direction position determining section 1b with a circular point, and the distance can be accurately determined in the vertical direction (z axial direction) between the first and second focusing lenses 2a and 2b, which are fixed to the holder member 1A, and the upper surface of the sensor chip 5. As a result, the accuracy for the parts, the assembly and the implementation are improved, thereby achieving a focus-adjustment free image capturing module 10A.

This is a case where the height direction position determining section 1bA touches the sensor chip 5 by, not a flat surface (step portion 1f) as described in Embodiment 1, but by a point (circular protruding portion), and a position is determined. When the surface of the height direction position determining section 1b touches the upper surface of the sensor chip 5, the touching portion has a relatively large area (or long distance), resulting in requiring more accuracy. If there is a roughness on the surface to touch, the accuracy will decrease (the worst portion touches the upper surface of the sensor chip). On the other hand, when the touching portion of the height direction position determining section 1bA described above is defined to be a circular point, and the manufacturing the tolerance of parts is determined by the circular point and is controlled, the distance between the lens fixed to the holder member 1A and the upper surface of the sensor chip 5 can be determined more accurately from the viewpoint of manufacturing and assembling the parts. Note that, if the circular point is too small, the circular point may be smashed or deformed due to the insufficient formation with the forming material.

(Embodiment 3)

In Embodiment 2 described above, the height direction position determining section (protruding portion) in a pointed shape (circular shape or ellipse shape) has been described. In Embodiment 3, the number of the height direction position determining section in a pointed shape (circular shape or ellipse shape) will be described.

Figure 5:
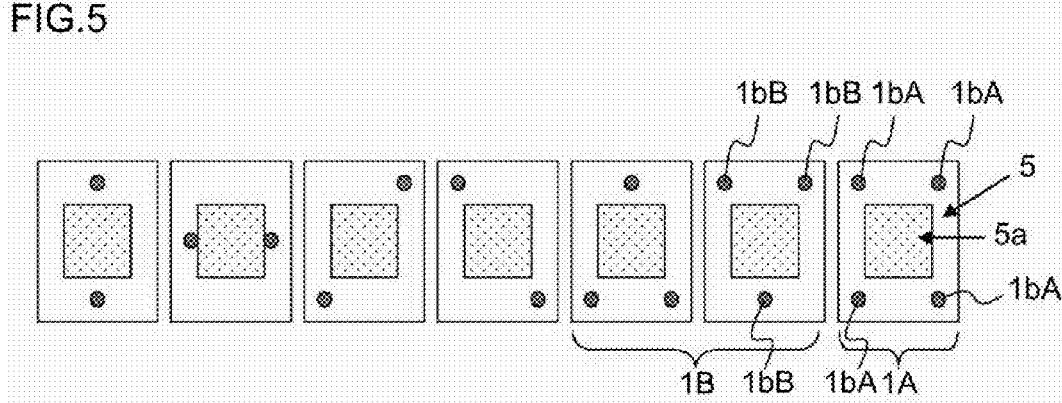
FIG. 5 is a plan view schematically illustrating a positional relationship between an upper surface of a sensor chip and a height direction position determining section having a pointed shape in an image capturing module according to Embodiment 3 of the present invention.

FIG. 5 is a plan view schematically illustrating a positional relationship between an upper surface of a sensor chip and a height direction position determining section in a pointed shape in an image capturing module according to Embodiment 3 of the present invention. Note that the same reference number is denoted to a constituent member having the same function or effect as a constituent member in FIG. 1 or 4.

In FIG. 5, the positional relationship between the upper surface of the sensor chip 5 and three points of the height direction position determining section is such that the three points are positioned avoiding the image capturing area 5a. The three points of the height direction position determining section form an area by connecting the three points, and therefore, all the three points touch the upper surface of the sensor chip 5 without fail. As a result, the positional determination in the height direction will have a finer accuracy. In a case with two points, the holder member 1 may move rotationally around the line connecting the two points and may be tilted, resulting in a poor accuracy for determining a position in the height direction. However, when at least one of the two points touches in a surface or is an ellipse, the holder member will not tilt and will be stabilized as in the case with three points. In addition, when four points of the height direction position determining section 1bA in a pointed shape touch the upper surface of the sensor chip 5 as with the height direction position determining section 1bA in the image capturing module 10A according to Embodiment 2 described above, one of the four points of the height direction position determining section 1bA may not touch the upper surface. On the other hand, when three points touch the surface of the sensor chip 5 as with the height direction position determining section 1bB, all the points touch the surface of the sensor chip 5. When adhesive is provided for the substrate 4 in advance and the height direction position determining section 1bA or 1bB in a pointed shape of the holder member 1 is provided for the surface of the sensor chip 5, the position in plane directions may be determined by an automated position determining apparatus that precisely recognizes an image, and further, the height direction position determining section 1bA or 1bB may be pressed by a predetermined weight to be positioned. Subsequently, the adhesive 7a is cured. If the amount of the adhesive 7a is not enough for all the circumference, a hole is made somewhere in the middle and dust enters from the hole.

It is preferable for the touching positions of the three points of the height direction position determining section 1bB to be as close to the outer peripheral end of the sensor chip 5 on the substrate 4 as possible so that the area formed by the three points becomes large. However, the edge of the sensor chip 5 is warped because the sensor chip 5 is cut out and experiences chipping, and the three protruding portions of the height direction position determining section 1bB are formed in such a manner to avoid a deformed portion (warped portion) of a surface end edge portion of the sensor chip 5 due to the dicing of the side surface. When the step portion 1f directly touches the surface of the sensor chip 5 as with the height direction position determining section according to Embodiment 1, the deformed portion (warped portion) due to the dicing side surface of the surface end portion of the sensor chip 5 may be formed in such a manner to dent and release the step portion 1f.

Although not specifically described in Embodiments 1 to 3, a case is also conceivable where resin mold is filled in between the infrared rays cut filter 6, which cuts off infrared rays from incident light that has passed through the focusing lenses 2a and 2b and outputs the incident light to the side of the sensor chip 5, and the sensor chip 5 to determine a position in the height direction (z axial direction). However, in such a case, the filling step with resin mold is required, and as a result, the number of parts and the manufacturing steps will increase as well as the accuracy for positioning the height direction (z axial direction) will decrease for the filling of the resin mold.

Figure 6:
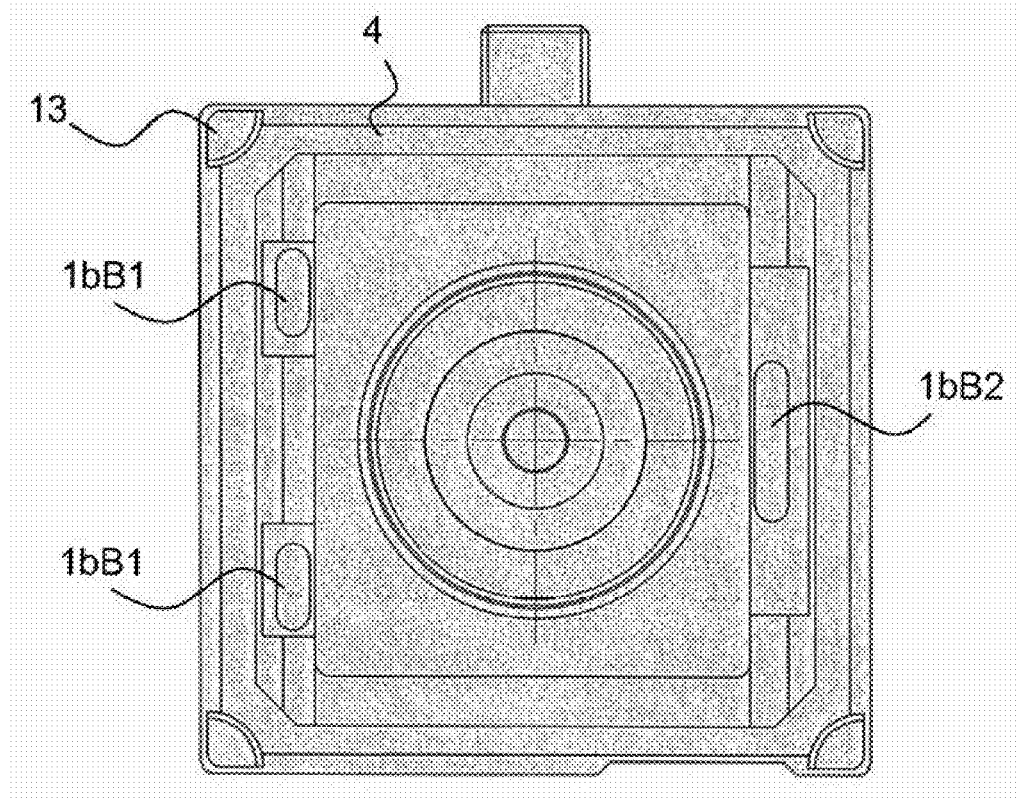
FIG. 6 is a diagram illustrating a back side of a height direction position determining section in an ellipse shape according to Embodiment 3, illustrating a case where four pins fix a substrate.

FIG. 6 is a diagram illustrating the back side of the height direction position determining section 1bB in an ellipse shape according to Embodiment 3, illustrating a case where four pins 13 fix the substrate 4.

When the focusing lenses 2a and 2b for forming an image of a subject light on the sensor chip 5 are accommodated and fixed to the bottom surface 1c of the cavity portion on the back side of the holder member 1, the protruding portions may be provided to the bottom surface 1c of the cavity portion on the back side. If manufacturing the tolerance for manufacturing or assembling of parts is controlled in an image forming distance between the three protruding points and the three points of height direction position determining section 1bB, the position can be determined in the height direction (z axial direction) with a higher accuracy so as to form an image of incident light accurately on the sensor chip 5.

(Embodiment 4)

In Embodiment 1 described above, a case has been described where the height direction position determining section 1b in a shape of a flat surface of the holder member 1 is directly placed on the upper surface of the sensor chip 5 in order to accurately determine the distance between the focusing lenses 2a and 2b fixed to the holder member 1 and the upper surface of the sensor chip 5. In Embodiment 2, a case has been described where the height direction position determining section 1b is received as a shape of a point (circular shape or ellipse shape) on the upper surface of the sensor chip 5, instead of being received as the shape of a flat surface of the height direction position determining section 1bA. In Embodiment 3, the number (three, herein) of the height direction position determining section in a pointed shape (circular shape or ellipse shape) has been described. In Embodiment 4, a case will be described where all the surface of the step portion of the holder member 1 is directly placed, as the height direction position determining section in a shape of a flat surface of the holder member 1, on the upper surface of the sensor chip 5.

FIG. 10(a) is a top view schematically illustrating an exemplary essential structure of an image capturing module according to Embodiment 4 of the present invention. FIG. 10(b) is a longitudinal cross sectional view along the line A-A in FIG. 10(a). FIG. 10(c) is a top view of the image capturing module in FIG. 1 for comparison with FIG. 10(a). FIG. 10(d) is a longitudinal cross sectional view along the line B-B in FIG. 10(c).

In FIGS. 10(a) and 10(b), an image capturing module 10C according to Embodiment 4 includes: a holder member 1C functioning as a dustproof case; a first focusing lens 2a and a second focusing lens 2b vertically accommodated in the holder member 1C; a light shielding film 3 provided in between the first focusing lens 2a and the second focusing lens 2b and having a circular hole 3a (or circular transparent area) formed at a middle portion therein; a substrate 4; a sensor chip 5 provided on the substrate 4 and for functioning as a solid-state image capturing chip; an IR cut filter 6 fixed to a first step portion 1d inside the holder member 1C and positioned by traversing between the second focusing lens 2b and the sensor chip 5; and an adhering section 7 for adhering a bottom surface of an outer wall of the holder member 1C to the substrate 4.

The dustproof holder member 1C has a structure to cover the first focusing lens 2a, the light shielding film 3, the second focusing lens 2b, the IR cut filter 6 and the sensor chip 6, which are positioned respectively from the top, together with the substrate 4 to create sealed or semi-sealed inside. The holder member 1C is provided with a step 11a as an external appearance, and an upper portion of the step 11a is a cylinder shape and a lower portion thereof is a squared pipe shape, and further, a lower surface is opened having a plurality of steps. The holder member 1C is configured with a resin casing that has a thin outer wall and is capable of shielding the inside from light and sealing or semi-sealing the inside, and a circular hole 1a (or circular transparent area) is formed on the upper surface of the casing, namely on the upper surface of the cylinder shape above the step, as a first circular hole for allowing incident light to pass, opposing the first focusing lens 2a. In order for the optical axis of the first focusing lens 2a and the second focusing lens 2b to correspond to each other and pass the center of the circular hole 1a, the first focusing lens 2a, the light shielding film 3 and the second focusing lens 2b can be positioned by inserting and fixing the respective circular external shapes all the way to circular cavity portions of the holder member 1C in this order from the back of the opened lower surface of the holder member 1C.

In the dustproof holder member 1C, the height direction position determining section 1bC, which is directly placed on the sensor chip 5 by the weight of the holder member 1C itself without adhesive, is defined to be a part or all of the surface of the second step portion 1f on the back surface of the holder member 1C so as to accurately focus incident light on an image capturing area 5a of the sensor chip 5 and capture an image by the first focusing lens 2a and the second focusing lens 2b. As the height direction position determining section 1bC of the holder member 1C, a part or all of the surface of the second step portion 1f touches the sensor chip 5, so that the distance in the height direction (z axial direction) is accurately defined between the first and second focusing lenses 2a and 2b and the image capturing area 5a of the sensor chip 5. That is, the distance in the height direction between the bottom surface of the cavity portion on the back surface side of the holder member 1C, in which the first focusing lens 2a and the second focusing lens 2b are accommodated and positioned, and the end surface of the height direction position determining section 1b, which is protruded from the second step portion 1f of the holder member 1C, can be accurately controlled within the manufacturing the tolerance of parts. As a result, the holder member 1C can be directly positioned on the upper surface of the sensor chip 5 as the height direction position determining section 1bC without using adhesive, and the distance can be accurately determined in the vertical direction (z axial direction) between the first and second focusing lenses 2a and 2b, which are fixed to the holder member 1, and the upper surface of the sensor chip 5, without including a variation (large variation of about 5 to 25 μm) in thickness of the adhesive layer due to the adhesive. As a result, the accuracy for the parts, the assembly and the implementation are improved, thereby achieving a focus-adjustment free image capturing module 10C.

According to Embodiment 4 as described above, the step portion 1f of the holder member 1C, which is supported directly by the surface of the sensor chip functioning as an image capturing chip, is defined as the height direction position determining section 1bC for the first and second focusing lenses 2a and 2b and the surface of the sensor chip 5. However, when an area (bottom area) for placing the holder member is small, such as a case where the height direction position determining section 1bC is a point (protruding portion), the step portion 1f of the holder member 1C is pressed by weight and becomes easy to be deformed at the time of auto-placing of the holder member 1C. As a result, an error occurs in the distance between the first and second focusing lenses 2a and 2b and the image capturing area of the surface of the sensor chip 5. Therefore, two surfaces touch a part or all of the surface of the step portion 1f between the height direction position determining section 1bC and of the holder member 1C and the surface of the sensor chip 5. Thus, when a larger area is provided for the touching, the height direction position determining section 1bC may be smashed or deformed, and an error of about 1 μm may occur for providing an area of a metal molding. However, such an error is significantly small compared to an error of about 10 μm (variation between 5 to 25 μm) in the case where adhesive is interposed.

Other than the case where the height direction position determining section 1bC touches the surface of the sensor chip 5 by two surfaces of a part or all of the step portion 1f as in Embodiment 4 described above, the height direction position determining section 1bC may touch the surface of the sensor chip 5 by four or more surfaces. However, the case with three surfaces is more stable and preferable.

In order not to smash the protruding portion at the time of placing the holder, it is preferable for the protruding portion having a small placing area to protrude a little although it may also depend on the material quality of the resin material of the holder member 1C, the placing area (bottom area of the protruding portion), and the weight at the time of placing (the protruding portion will not be smashed only by the weight of the holder including a lens therein).

Figure 12:
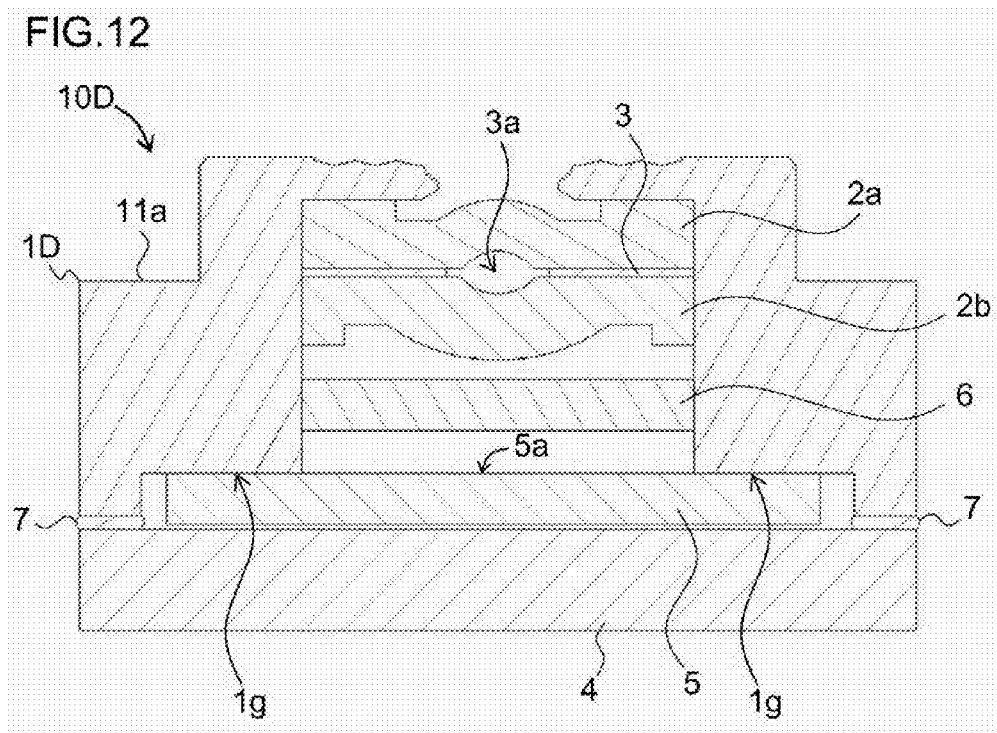
FIG. 12 is a longitudinal cross sectional view schematically illustrating an exemplary variation of the image capturing module according to Embodiment 4 of the present invention.

Further, although not specifically described in Embodiment 4 described above, the number of steps on the back surface of the holder member 1C is reduced and a reference surface with the surface of the sensor chip 5 is formed at a position even closer to the accommodating position for the first focusing lens 2a and the second focusing lens 2b in order to accurately determine the distance between the first and second focusing lenses 2a and 2b and the image capturing area of the surface of the sensor chip 5; and as a result, the error when manufacturing a metal mold can be further reduced and the forming accuracy can be further improved. In this case, as an image capturing module 10D illustrated in FIG. 12, a step 1g (which has a larger area than the step 1f in FIG. 10 and touches the surface of the sensor chip 5) of the holder member 1D may be provided, which is placed on the surface of the sensor chip 5 from the reference surface (bottom surface 1c on the cavity portion on the back side) for housing a lens in a holder of the holder member 1D, without interposing other steps (the IR cut filter 6 is positioned at the step 1d of the interior and the near side).

Further, although totally different from the cases with Embodiments 1 to 4 described above in terms of the structure, an application example will be described. The sensor chip 5 is mounted on a thin and easy to bend, flexible substrate, and a sensor cover (a lens is not accommodated and the sensor cover has a different structure from the structure of the holder member described above) is placed on the surface of the sensor chip 5 to be adhered by adhesive at a vicinity on the substrate. A lens is provided on the sensor cover as an auto focusing and motor-driven lens unit. The lens unit stops the driving of the motor at a lens position where a focusing point is focused in an electronic control manner on the image capturing element. Herein, a predetermined portion (height direction position determining section) of the sensor cover is directly placed on the surface of the sensor chip 5, so that the sensor cover will not relatively tilt against the surface of the sensor chip 5. As a result, the lens above will not tilt, either.

Figure 13:
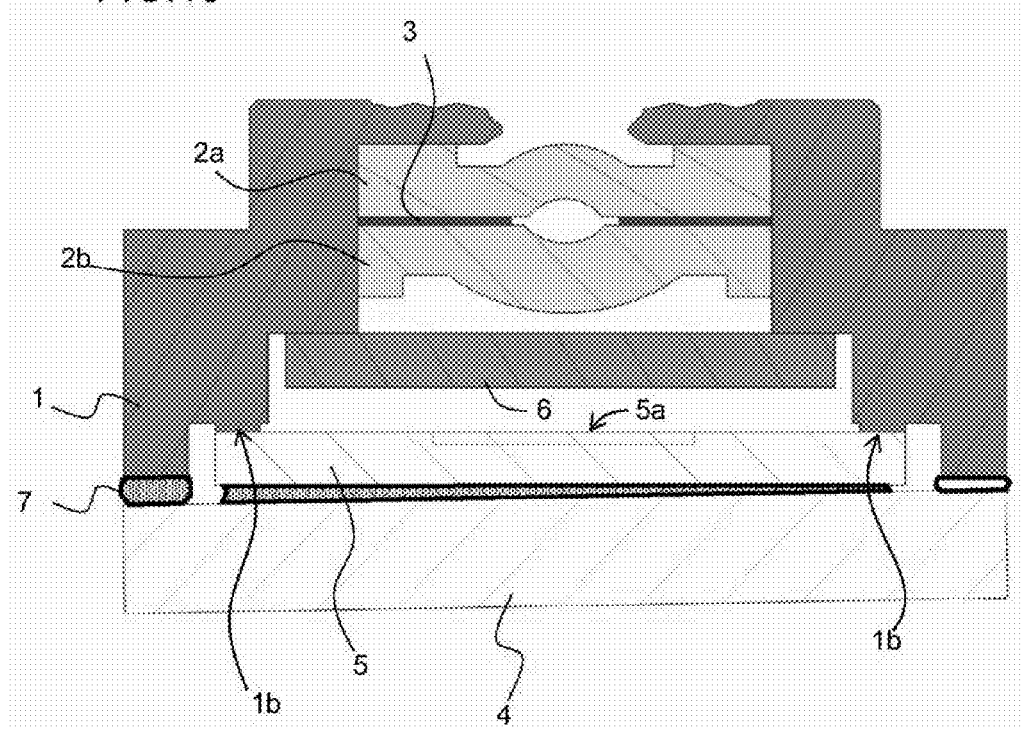
FIG. 13 is a longitudinal cross sectional view of an image capturing module explaining another effect of the image capturing module of the present invention.

Further, in a case where the sensor chip 5 is implemented with an inclination with respect to the substrate 4 as illustrated in FIG. 13, the height direction position determining section 1b of the holder 1 is placed on the surface of the sensor chip 5, and the holder 1 is implemented in a tilted state as similar to the surface of the sensor chip 5. Therefore, even when the sensor chip 5 is implemented with an inclination with respect to the substrate 4, the performance of such a camera will not be influenced by the inclination.

(Embodiment 5)

Figure 7:
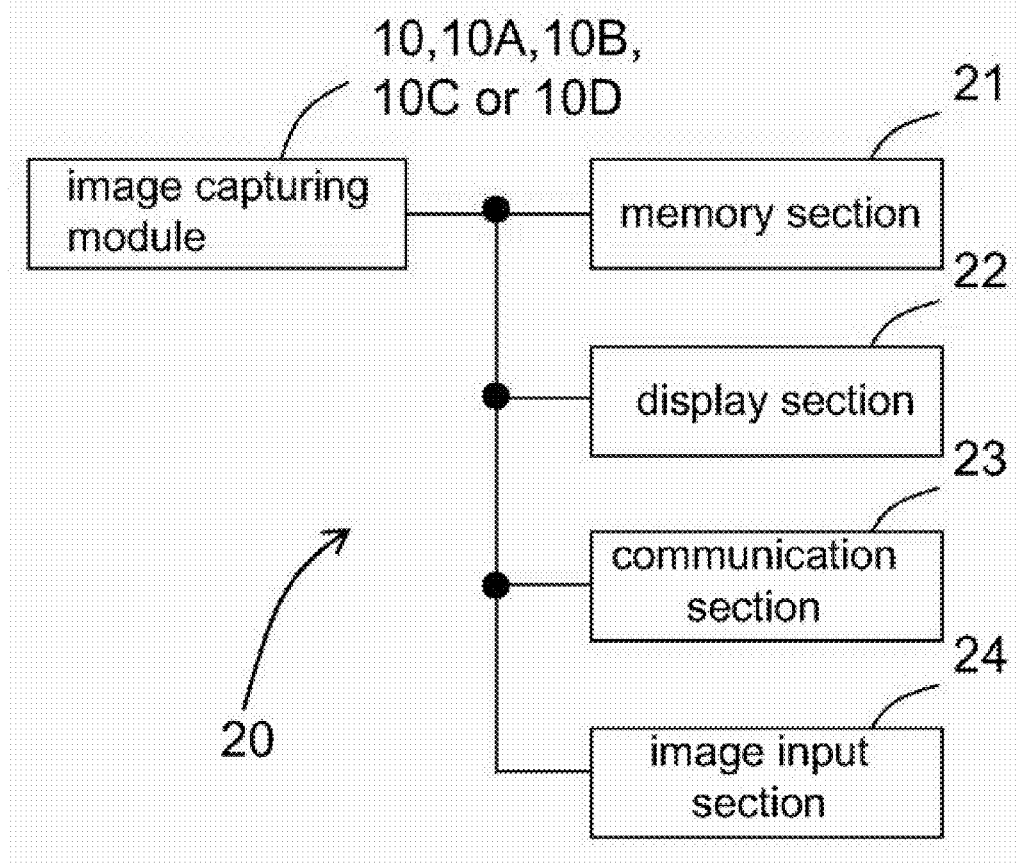
FIG. 7 is a block diagram illustrating an exemplary diagrammatic structure of an electronic information device using the image capturing module according to any of Embodiments 1 to 4 of the present invention in an image capturing section, as described in Embodiment 5 of the present invention.
Figure 8:
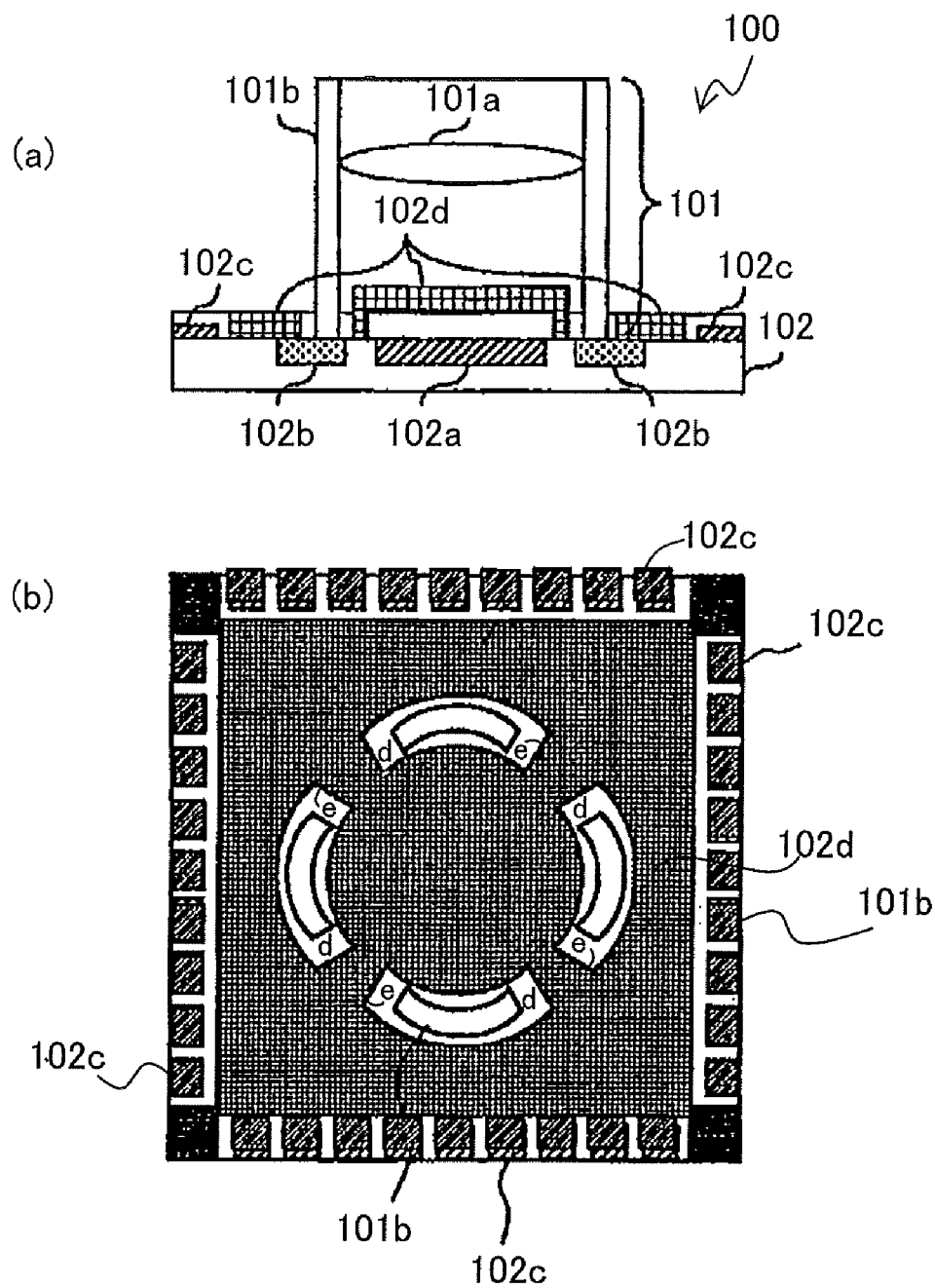
FIG. 8 is a structural diagram schematically illustrating an exemplary essential structure of a conventional image capturing module disclosed in Reference 1, where
Figure 9:
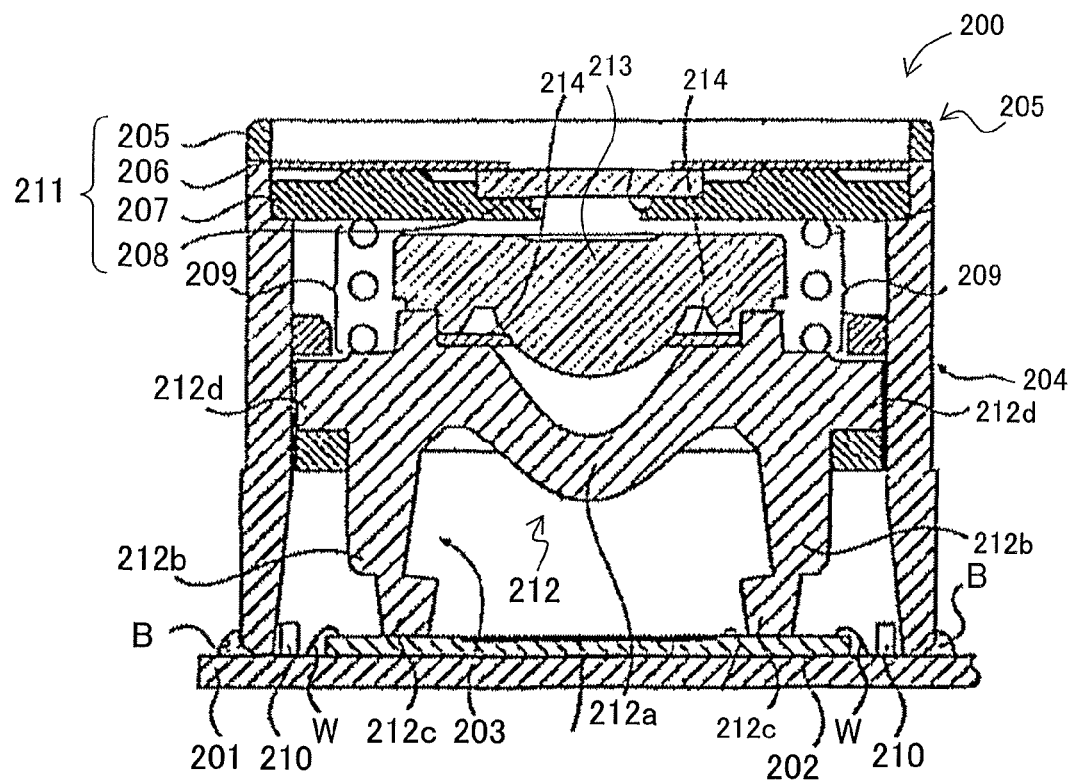
FIG. 9 is a longitudinal cross sectional view schematically illustrating an exemplary essential structure of a conventional image capturing apparatus disclosed in Reference 2.

FIG. 7 is a block diagram illustrating an exemplary diagrammatic structure of an electronic information device using the image capturing module according to any of Embodiments 1 to 4 of the present invention in an image capturing section thereof, as Embodiment 5 of the present invention.

In FIG. 7, the electronic information device 20 according to Embodiment 5 includes: an image capturing apparatus 10, 10A, 10B, 10C or 10D of Embodiments 1 to 4 described above; a memory section 21 (e.g., recording media) for data-recording a color image signal from the image capturing apparatus 10, 10A, 10B, 10C or 10D after a predetermined signal process is performed on the image signal for recording; a display section 22 (e.g., a color liquid crystal display apparatus) for displaying the color image signal from the image capturing apparatus 10, 10A, 10B, 10C or 10D on a display screen (e.g., liquid crystal display screen) after predetermined signal processing is performed on the color image signal for display; a communication section 23 (e.g., a transmitting and receiving device) for communicating the color image signal from the image capturing apparatus 10, 10A, 10B, 10C or 10D after predetermined signal processing is performed on the image signal for communication; and an image output section 24 for printing the color image signal from the image capturing apparatus 10, 10A, 10B, 10C or 10D after predetermined signal processing is performed for printing.

As the electronic information device 20, an electronic information device that has an image input device is conceivable, such as a digital camera (e.g., digital video camera and digital still camera), an image input camera (e.g., a monitoring camera, a door phone camera, a camera equipped in a vehicle, and a television camera), a scanner, a facsimile machine and a camera-equipped cell phone device.

Therefore, according to Embodiment 5 of the present invention, the color image signal from the image capturing apparatus 10, 10A, 10B, 10C or 10D can be: displayed on a display screen finely, printed out on a sheet of paper using an image output section 24, communicated finely as communication data via a wire or a radio; stored finely at the memory section 21 by performing predetermined data compression processing; and various data processes can be finely performed. The electronic information device 20 may include at least any of the memory section 21, the display section 22, the communication section 23, and the image output section 24.

Although not specifically described in Embodiments 1 to 4, in the image capturing module 10, 10A, 10B, 10C or 10D, the sensor chip 5 is attached on the substrate 4 and the holder member 1, 1A, 1C or 1D, which accommodates the focusing lenses 2a and 2b for forming an image of a subject light on the sensor chip 5, inside the cavity portion on the back side thereof, is attached to the substrate 4 to cover the sensor chip 5 by the cavity portion to make the inside of the cavity portion in a sealed or a semi-sealed state (including a state where a partial opening is connected to the inside). In the image capturing module 10, 10A, 10B, 10C or 10D, the height direction position determination section 1b, 1bA, 1bB or 1bC for directly touching the surface of the sensor chip 5 is provided for the step portion 1f or 1g provided in the cavity portion on the back side of the image capturing module. As a result, the structure becomes simpler by reducing the number of constituent parts, resulting in the achievement of the effect of the present invention, such as the reduction of the man-hours for assembling, the improvement on the assembling accuracy, and disposing of the optical adjustment.

As described above, the present invention is exemplified by the use of its preferred Embodiments 1 to 5. However, the present invention should not be interpreted solely based on Embodiments 1 to 5 described above. It is understood that the scope of the present invention should be interpreted solely based on the claims. It is also understood that those skilled in the art can implement equivalent scope of technology, based on the description of the present invention and common knowledge from the description of the detailed preferred Embodiments 1 to 5 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of an image capturing module, in which an image capturing element having a plurality of light receiving sections for performing photoelectric conversions on and capturing image light from a subject and a lens for forming an image of incident light on the image capturing element are modularized (integrated); a method for manufacturing the image capturing module; and an electronic information device, such as a digital camera (e.g., digital video camera and digital still camera), an image input camera (e.g., car-mounted camera), a scanner, a facsimile machine, a camera-equipped cell phone device, and a personal digital assistant (PDA), having the image capturing module as an image input device (e.g., car-mounted camera) used in an image capturing section thereof. According to the present invention with the structure described above, the height direction position determining section is directly placed on the upper surface of the sensor chip as a reference surface of the holder member to determine the position in the height direction. Some variation factors may be conceivable with respect to the accuracy of assembling a focusing lens to the holder member and the accuracy of casting the holder member. However, the present invention has the smaller number of parts compared to the conventional structures and has a simple structure. Therefore, the man-hours of assembling can be reduced and the assembling accuracy can be improved, achieving no needs for focus adjustment. Further, the surface of the sensor chip and the height direction determining section are not adhered to each other and there is no adhesive interposing therebetween. Therefore, the assembly can be conducted with more accurate distance between the lens and the sensor chip, achieving no needs for focus adjustment.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image capturing module, comprising:
a holder member, which accommodates therein a focusing lens for forming an image of a subject light on an image capturing chip attached on a substrate and is adhered to the substrate to cover the image capturing chip,
wherein a step portion of the holder member is provided as a height direction position determining section for the focusing lens and the surface of the image capturing chip, without interposing any other steps,
the height direction position determining section is an all flat surface of the step portion, and
the height direction position determining section contacts the image capturing chip only by surface contact such that no adhesive is interposed therebetween.

2. An image capturing module, comprising a holder member, where an image capturing chip is attached to a substrate and a focusing lens for forming an image of a subject light on the image capturing chip is accommodated inside a cavity portion on a back side, the holder member being adhered to the substrate to cover the image capturing chip by the cavity portion on the back side to make the inside of the cavity portion on the back side sealed or semi-sealed,
wherein a step portion of the holder member is provided as a height direction position determining section from a bottom surface of the cavity portion, which is a lens accommodating reference surface, without interposing any other steps,
the height direction position determining section is an all flat surface of the step portion, and
the step portion provided inside the cavity portion on the backside is provided with the height direction position determining section for the focusing lens and the surface of the image capturing chip, the height direction position determining section contacting a top surface of the image capturing chip only by surface contact between the holder member and the image capturing chip such that no adhesive is interposed therebetween.

3. An image capturing module according to claim 2, wherein the step portion is formed to avoid a deformed portion of a surface end edge of the image capturing chip due to a dicing edge surface.

4. An image capturing module according to claim 2, wherein the focusing lens is positioned on a bottom surface inside the cavity portion on the back side of the holder member and accommodated, and a side wall inside the cavity portion on the back side is adhered and fixed to an outer circumference end surface of the focusing lens.

5. An image capturing module according to claim 1, wherein the focusing lens is a coupling lens of two lenses, and a light shielding film having a light passing hole provided in a middle portion thereof is held between the two lenses.

6. An image capturing module according to claim 2, wherein the focusing lens is a coupling lens of two lenses, and a light shielding film having a light passing hole provided in a middle portion thereof is held between the two lenses.

7. An image capturing module according to claim 1, wherein an infrared ray cut filter is provided inside the holder member in such a manner to traverse above the image capturing chip, the infrared ray cut filter cutting infrared rays from incident light that has passed the focusing lens and outputting the incident light to the side of the image capturing chip.

8. An image capturing module according to claim 2, wherein an infrared ray cut filter is provided inside the holder member in such a manner to traverse above the image capturing chip, the infrared ray cut filter cutting infrared rays from incident light that has passed the focusing lens and outputting the incident light to the side of the image capturing chip.

9. An image capturing module according to claim 1, wherein the height direction position determining section touches the top surface of the image capturing chip by two surface touch or three surface touch by a part or all of the surface of the step portion.

10. An image capturing module according to claim 2, wherein the height direction position determining section touches the top surface of the image capturing chip by two surface touch or three surface touch by a part or all of the surface of the step portion.

11. A method for manufacturing an image capturing module, comprising:
a sensor unit forming step of attaching an image capturing chip to a substrate;
a lens unit forming step of accommodating and fixing a focusing lens for forming an image of a subject light on the image capturing chip, inside a cavity portion on a back side of a holder member, the lens unit forming step and the sensor unit forming step being performed either in this order or in a reverse order; and
a sensor unit and lens unit coupling step of allowing a height direction position determining section of a step portion provided inside the cavity portion on the back side to directly touch a top surface of the image capturing chip and covering the image capturing chip by the cavity portion on the back side, and further, in this state, adhering the holder member to the substrate to seal or semi-seal the cavity portion on the back side,
wherein the step portion of the holder member is provided without interposing any other steps, and the height direction position determining section is an all flat surface of the step portion, and
the holder member is supported by the image capturing chip only by surface contact between the height direction position determining section and the top surface of the image capturing chip such that no adhesive is interposed therebetween.

12. A method for manufacturing an image capturing module, comprising:
a sensor unit forming step of attaching an image capturing chip to a substrate;
a lens unit forming step of accommodating and fixing a focusing lens for forming an image of a subject light on the image capturing chip, inside a holder member, the lens unit forming step and the sensor unit forming step being performed either in this order or in a reverse order; and
a sensor unit and lens unit coupling step of allowing a height direction position determining section provided in the inside, at a step portion of the holder member without interposing any other step portions, to directly touch a top surface of the image capturing chip and covering the image capturing chip, and further, in this state, adhering the holder member to the substrate to seal or semi-seal the inside,
wherein the height direction position determining section is an all flat surface of the step portion, and
the holder member is supported by the image capturing chip only by surface contact between the height direction position determining section and the top surface of the image capturing chip such that no adhesive is interposed therebetween.

13. A method for manufacturing an image capturing module according to claim 11, wherein the sensor unit forming step mounts the image capturing chip on a predetermined position on the substrate, wire-bonds a plurality of input and output pads of the image capturing chip and predetermined terminals of the substrate, and fixes the image capturing chip to the substrate.

14. A method for manufacturing an image capturing module according to claim 12, wherein the sensor unit forming step mounts the image capturing chip on a predetermined position on the substrate, wire-bonds a plurality of input and output pads of the image capturing chip and predetermined terminals of the substrate, and fixes the image capturing chip to the substrate.

15. A method for manufacturing an image capturing module according to claim 11, wherein the lens unit forming step inserts and positions the focusing lens into a bottom surface of the cavity portion on the back side of the holder member, and further, in this state, adheres and fixes an inner circumference wall of the cavity portion on the back side of the holder member to an outer circumference end surface of the focusing lens.

16. A method for manufacturing an image capturing module according to claim 12, wherein the lens unit forming step inserts and positions the focusing lens into a bottom surface of the cavity portion on the back side of the holder member, and further, in this state, adheres and fixes an inner circumference wall of the cavity portion on the back side of the holder member to an outer circumference end surface of the focusing lens.

17. A method for manufacturing an image capturing module according to claim 11, wherein the sensor unit and lens unit coupling step aligns the holder member, which accommodates the focusing lens, with the image capturing chip, which is attached to the substrate, by an automated assembling apparatus for recognizing a plane image of the image capturing chip and directly places the holder member on the image capturing chip.

18. A method for manufacturing an image capturing module according to claim 12, wherein the sensor unit and lens unit coupling step aligns the holder member, which accommodates the focusing lens, with the image capturing chip, which is attached to the substrate, by an automated assembling apparatus for recognizing a plane image of the image capturing chip and directly places the holder member on the image capturing chip.

19. An electronic information device using the image capturing module according to claim 1 as an image input device in an image capturing section.

20. An electronic information device using the image capturing module according to claim 2 as an image input device in an image capturing section.

* * * * *